US006925563B1

(12) United States Patent
Jennings

(10) Patent No.: US 6,925,563 B1
(45) Date of Patent: Aug. 2, 2005

(54) MULTIPLICATION OF MODULAR NUMBERS

(75) Inventor: William T. Jennings, Plano, TX (US)

(73) Assignee: Raytheon Company, Waltham, MA (US)

( * ) Notice: Subject to any disclaimer, the term of this patent is extended or adjusted under 35 U.S.C. 154(b) by 933 days.

(21) Appl. No.: 09/668,027

(22) Filed: Sep. 21, 2000

Related U.S. Application Data
(60) Provisional application No. 60/155,505, filed on Sep. 22, 1999, now abandoned.

(51) Int. Cl.$^7$ .............................. G06F 7/00; H04K 1/00
(52) U.S. Cl. ........................ 713/174; 713/174; 708/491
(58) Field of Search ............................ 713/174; 708/491

(56) References Cited

U.S. PATENT DOCUMENTS

| | | | | |
|---|---|---|---|---|
| 4,686,645 A | * | 8/1987 | McCanny et al. | 708/620 |
| 5,060,183 A | * | 10/1991 | Sakashita et al. | 708/625 |
| 5,073,870 A | | 12/1991 | Morita | 364/746 |
| 5,101,431 A | | 3/1992 | Even | 380/30 |
| 5,321,752 A | * | 6/1994 | Iwamura et al. | 713/174 |
| 5,764,772 A | | 6/1998 | Kaufman et al. | 380/30 |
| 5,815,573 A | | 9/1998 | Johnson et al. | 380/21 |
| 5,914,892 A | * | 6/1999 | Wang et al. | 708/626 |
| 6,061,706 A | | 5/2000 | Gai et al. | 708/491 |
| 6,397,241 B1 | * | 5/2002 | Glaser et al. | 708/625 |

FOREIGN PATENT DOCUMENTS

| | | | | |
|---|---|---|---|---|
| WO | WO 99/27677 | 6/1999 | | H04L/9/00 |

OTHER PUBLICATIONS

Pending U.S. Appl. No. 09/668,026 entitled "Key Escrow Systems", by William T. Jennings, 113 total pages, Sep. 21, 2000.

Choi, Sung–Wook, and Woo, Chong–Ho, "Bit–Level 1–Dimensional Systolic Modular Multiplication", Journal of the Korean Institute of Telematics and Electronics, Sep. 1996, Korea Inst. Telematics & Electron, South Korea, vol. 33B, No. 9, pp. 62–69, XP000619886.

Blum, Thomas, et al, "Montgomery Modular Exponentiation on Reconfigurable Hardware", Proceedings 14th IEEE Symposium on Computer Artihmetic, Adelaide, AU, Apr. 14–16, 1999, Los Alamitos, CA, pp. 70–77, XP–000876409.

Komerup, Peter, "A Systolic, Linear–Array Multiplier for a Class of Right–Shift Algorithms", IEEE Transactions on Computers, IEEE, Inc., New York, vol. 43, No. 8, Aug. 1, 1994, pp. 892–898.

Chen, Po–Song, et al, "A Systolic RSA Public Key Cryptosystem", IEEE International Symposium on Circuits and Systems (ISCAS), US, New York, 1996, pp. 408–411, XP000619797.

Ciminiera, Luigi, "Pipelined Arrays for Modular Multiplication", IEEE, Monterey, CA, May 31–Jun. 3, 1998, pp. 397–400, XP000873523.

PCT Written Opinion Dated Sep. 5, 2001 for PCT/US00/26073 filed Sep. 22, 2000.

PCT International Search Report dated Aug. 29, 2001 for PCT/US01/26073 filed Sep. 22, 2000.

Jennings, William T., Dunham, James G., "Key Escrowing Systems and Limited One Way Functions", Conference Proceedings, vol. I, 19th National Information Systems Security Conference, Baltimore, MD, Oct. 22–25, 1996, 11 pages.

(Continued)

Primary Examiner—Emmanuel L. Moise
Assistant Examiner—Taghi T. Arani
(74) Attorney, Agent, or Firm—Baker Botts L.L.P.

(57) ABSTRACT

A circuit for the implementation of modular multiplication of numbers comprises an alternative formation of the algorithm first proposed by R. C. Montgomery. The modified Montgomery algorithm is implemented in one of a plurality of circuits comprising full adders, half adders, registers and gates.

26 Claims, 19 Drawing Sheets

OTHER PUBLICATIONS

Higgins, John C., "Evaluating the Strength of Ciphers", National Institute of Standards and Technology/National Computer Security Center, 18th National Information Systems Security Conference, Baltimore, MD, Oct. 10–13, 1995, pp. 395–403.

Alves–Foss, Jim, "The Use of Belief Logics in the Presence of Causal Consistency Attacks", Conference Proceedings, 20th National Information Systems Security Conference, Baltimore, MD, Oct. 1997, 12 pages.

Burrows, Michael, et al, "A Logic of Authentication", Association for Computing Machinery, Transactions on Computer Systems, Feb. 1990, vol. 8, No. 1, pp. 18–36.

Rivest, R. L., et al, "A Method for Obtaining Digital Signatures and Public–Key Cryptosystems", Communications of the ACM, Feb. 1978, vol. 21, No. 2, pp. 120–126.

Cover Page and LOC publication information page (2 pgs) for: Welsh, Dominic, "Codes and Cryptography", Oxford University Press, Oxford, UK, 1988, LOC No. Z103.W46, containing 257 pages.

Rabin, Michael O., "Digitalized Signatures and Public–Key Functions As Intractable as Factorization", MIT Laboratory for Computer Science, TR–212, Jan. 1979, pp. 1–16.

Montgomery, Peter L., "Modular Multiplication Without Trial Division", Mathematics of Computation, American Mathematical Society, Providence, RI, Apr. 1985, vol. 44, No. 170, pp. 519–521.

Cover Page and LOC publication information page (2 pgs) for: Soderstrand, Michael A., et al, "Residue Number System Arithmetic: Modern Applications in Digital Signal Processing", IEEE Press, 1986, LOC No. QA247.35.R45.

Di Claudio, Elio D., Piazza, Francesco, "Fast Combinatorial RNS Processors for DSP Applications", IEEE Transactions on Computers, May 1995, vol. 44, No. 5, pp. 624–633.

Alia, Giuseppe, Martinelli, Enrico, "A VLSI Modulo m Multiplier", IEEE Transactions on Computers, Jul. 1991, vol. 40, No. 7, pp. 873–878.

Paliouras, V., et al., "Systematic Derivation of the Processing Element of a Systolic Array Based on Residue Number System", 1992 IEEE International Symposium on Circuits and Systems, May 10–13, 1992, San Diego, CA, vol. 2 of 6, pp. 815–818.

Parhami, Behrooz,, Hsun–Feng Lai, "Alternate Memory Compression Schemes for Modular Multiplication", IEEE Transactions on Signal Processing, Mar. 1993, vol. 41, No. 3, pp. 1378–1385.

Walter, Colin D., "Systolic Modular Multiplication", IEEE Transactions on Computers, Mar. 1993, vol. 42, No. 3, pp. 376–378.

Blase, Matt, et al., "The Risks of Key Recovery, Key Escrow, and Trusted Third Party Encryption", Presentation at the 1998 RSA Data Security Conference, Jan. 1998, San Francisco, CA, 21 pages.

Abelson, Hal, et al, "The Risks of Key Recovery, Key Escrow, and Trusted Third Party Encryption", May 27, 1997 (report on–line, accessed Jan. 18, 1998), 29 pages.

Merkle, R.C., Secure Communications Over Insecure Channels, Communications of the ACM, Apr. 1978, vol. 21, No. 4, pp. 294–299.

Barlow, J.P., "A Plain Text on Crypto Policy", Communications of the ACM, vol. 36, No. 11, Nov. 1993, pp. 21–26.

Holleyman, Robert W. "On the Export of Software with Encryption Capabilities", testimony presented at Key Escrow Meeting, National Institute of Standards and Technology, Gaithersburg, MD, Sep. 6, 1995, pp. 1–7.

Cover Page and LOC publication information page (2 pgs) for: Schwartau, Winn, "Information Warfare: Chaos on the Electronic Superhighway", Thunder's Mouth Press, New York, 1994, LOC No. QA76.9.A25S354, containing 432 pgs.

Staniford–Chen, Heberlein, L. Todd, "Holding Intruders Accountable on the Internet", Proceedings of the 1995 IEEE Symposium on Security and Privacy, May 8–10, 1995, Oakland, CA, pp. 39–49.

Walker, S.T., et al, "Commercial Key Escrow: Something for Everyone Now and for the Future", Trusted Information Systems, Inc., Report #541, Jan. 3, 1995, 10 pages.

Ameke, David, "Clipper Chip Technology", AT&T Media Relations/Marketing Communications, May 1993, 21 pages.

Madsen, Wayne, "Information Warfare: Indications and Warnings", Conference Proceedings, 19th National Information Systems Security Conference, Baltimore, MD, Oct. 22–25, 1996, pp. 726–736.

Denning, Dorothy E., "Descriptions of Key Escrow Systems", unpublished, http:/www.cosc.georgetown.edu/~denning/crypto /Appendix html, Feb. 26, 1997, 38 pages.

Cover Page and LOC publication information page (2 pgs) for: Aho, Alfred, "Currents in the Theory of Computing", Prentice–Hall, Inc., Englewood Cliffs, NJ, 1973, LOC No. QA267.5.S4A33, containing 245 pages.

Orup, Holger, "Simplifying Quotient Determination in High-Radix Modular Multiplication", Proceedings of the 12th Symposium on Computer Arithmetic, Jul. 19–21, 1995, Bath, England, sponsored by the IEEE Computer Society Technical Committee on VLSI, pp. 193–199.

PCT Invitation to Pay Additional Fees, dated Mar. 20, 2001 for PCT/US00/26073 filed Sep. 22, 2000, 4 pages.

* cited by examiner

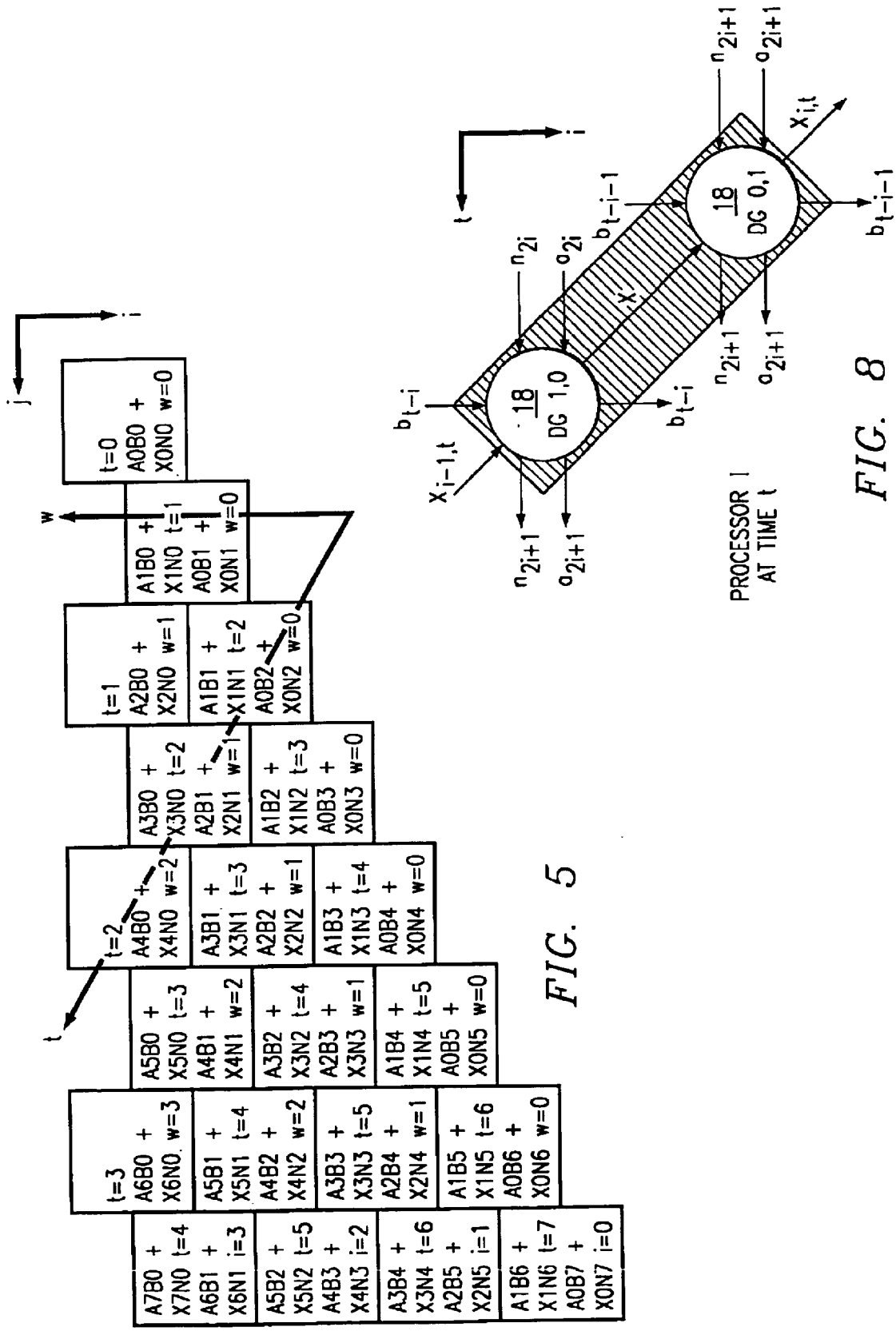

BITS OF Z FEED
SEQUENTIALLY
ACROSS

MULTIPLICATION OF MODULAR NUMBERS

RELATED APPLICATION

This application claims the benefit of U.S. provisional application Ser. No. 60/155,505, filed Sep. 22, 1999, entitled Key Escrow Systems, now abandoned.

TECHNICAL FIELD OF THE INVENTION

The present invention relates to multiplication of modular numbers and, in particular, a two-dimensional dependency array of cells where each cell comprises a computing circuit.

BACKGROUND OF THE INVENTION

The proliferation of public cryptographic systems is a newly emerging phenomena. Only very recently are such systems being considered for widespread acceptance in the public domain. For many years cryptography was viewed as a tool solely for the military, of spies, and of diplomats. It has been the dawning of the information age, which has pushed these systems into the light of day. Indeed, our society is becoming so very dependent on information that the importance of protecting this information has become a vital social need. However, the introduction of cryptographic technology into the commercial or public sector has been met with some skepticism. This has been continuously complicated by various government attempts to control and regulate cryptographic systems for public usage. Indeed, there are numerous problems associated with public use of cryptographic systems. These problems include a wide range of different questions including legal liability issues, economic viability, national security, and even constitutional freedom-of-speech issues. There are direct conflicts that occur between the governmental need to be able to perform information gathering for national security and the need of the private sector to protect information from espionage or sabotage. Classes of cryptographic applications that are centrally related to the overall problem of public use of cryptographic technology include those that are associated with the related subjects of key distribution and key storage and retrieval.

There has been some reluctance in the public sector for the general use of cryptographic systems for day to day office applications. In part, this may be due to the potential risk of losing cryptographic keys resulting in permanent data loss. This results in the storage of keying material that must be carefully safeguarded. Indeed, it can be argued that the keying material may be more important to safeguard than the material the keys are protecting. Key storage cannot reliably depend on human memory, for instance. Unfortunately, if the keys are presumed to be "well-chosen" then the keys are not very easy for a human to conveniently remember. Therefore the keys must be stored somewhere. The keys may be physically stored, such as in a safe. In this case, the keys are stored on removable media, a physical device such as a smart card, or perhaps on paper. Alternatively, the keys may be electronically safeguarded. The keys may be permanently stored in an embedded physical device (such as in the U.S. Government's proposed Clipper chip) or electronically maintained in a secure manner by cryptographic protection methods. The later means that some other key or keys must then be in use by the secure system storing the key material. This secondary set of keys are referred to as Master Keys.

There may also be a large number of keys to manage and store. Keys that are stored electronically must likewise be protected. Consequently, a major concern associated with the storage of keying material is the simple loss of the keying information. Once data has been encrypted using a modern cryptographically secure cryptographic system, if for any reason the keys are lost, then all data thus encrypted is, for all practical purposes, totally unretrievable. One proposed application for the limited one-way algorithm is the possibility of creating a key retrieval system that permits keys to be reproduced based on a predetermined and controllable cost function.

A fundamental objective of modern cryptography is to construct data encryption systems, which preclude data recovery without possession of privately held keying information. The primary goal of the design of these systems is to insure that recovery of encrypted information without possession of the associated keying information is an intractable problem. The use of cryptography and cryptographic techniques has only started gaining widespread acceptance in the general commercial information industry in the last few years.

Outside the banking and financial industries, little use is still made of this technology for the purpose of general information storage and retrieval, especially for day to day operations. There continues to be a reluctance to use encryption except where absolutely necessary. One reason for this reluctance is that data once encrypted cannot be recovered without the keys. Lose the keys and one also loses the information. This, in part, is what motivates the notion of Key Escrow Systems.

The term Key Escrowing has recently emerged in the literature in reference to systems which are intended to provide the capability for cryptographic key storage and retrieval. These systems are also frequently referred to as Key Recovery Systems. Considerations for the design of such systems were largely ignored in the literature; that is until controversy arose over government proposals concerning public standards and legislation that would have required the creation of a national system for the mandatory escrowing of cryptographic keys. This would therefore require the creation of a national system of key depositories and the associated infrastructure that would be required. The debate sparked a very emotional dialogue due to the potential that such requirements might have for enormous economic impact, as well as potentially serious social consequences. Government requirements for key escrow stem from the desire of the government to restrain the propagation of strong cryptographic systems or, at a minimum provide a mechanism where the government can retain the ability to break those systems. Concerns for the needs of national defense as well as the needs of law enforcement drive the government requirements. Products containing strong encryption technology are beginning to be marketed on a global basis. The desire of government is to have mechanisms, such as key escrow, incorporated into products in order to enable the breaking of these otherwise unbreakable cryptosystems.

The controversy is that the government requirements for a national Key Escrow system are considered to be very expensive and prohibitively difficult to perform. Due to the sheer size and complexity of such a system, it may be impossible to insure security. The key escrows themselves become tempting targets for exploitation or for terrorist attack.

Key escrow is not simply a government initiative. The notion of key recovery also does have very important commercial applications. Corporations, for instance, have a large economic interest in protecting their internal information from industrial espionage. It would be preferred that internal company documentation be protected by encryption as a normal course of business. A problem stems from the large number of individuals involved and the transient nature of individual employment in this society. It may be several years from when data was stored until such time as it is retrieved. Employees may leave the company. Employees may encrypt data and then lose the keys. It may be difficult to identify and associate an employee with the data. In these circumstances, highly valued information may be permanently lost with serious impact on the corporation or company involved. Therefore, it is important that the cryptographic keying material associated with data archived into permanent storage be retained in a manner that permits the recovery of that data when needed. This needs to be accomplished in a reliable, yet secure manner.

The basic problem is that the mere existence of a database of keying information presents a fundamental security concern. The value of the key database itself is equal to that of the data that it protects. Therefore, a key database represents a high priority target for would be attackers. Undetected intrusion is a special concern. Moreover, such a database also potentially represents a tremendous potential for abuse by properly authorized parties who have access to it. Anyone who has master key access to the key database may freely read any of the information protected by any of the keys stored therein. Moreover, an otherwise authorized individual with access to this database may even use the keying information to alter or forge documents without the ability of the original document author to detect the change.

Key Escrow Systems are cryptographic systems used to store cryptographic keying material in a secure manner. These systems have requirements that are unique from other cryptographic systems. Abuse of access to cryptographic key material by authorized users has been largely ignored and methodologies for dealing with this problem have heretofore not been addressed. One of these possible methodologies, imposition of a key withdrawal cost function, is now under consideration.

SUMMARY OF THE INVENTION

Key escrow systems comprise a class of cryptographic systems specifically intended for the storage of cryptographic keying information. These systems have requirements unique from other common cryptographic applications and implementation of key escrow systems requires special considerations beyond those of other secure systems. This invention relates to new and unique techniques, which can be applied to systems such as those used for Key escrow. However, these techniques have a wider range of application. The described methodology for modular multiplication has a broad range of applicability in fields including Cryptography, Fault-Tolerant Computation, and Digital Signal Processing (DSP).

This invention relates to an original, modified representation of the Montgomery modular multiplication technique. The described technique results in a recursive loop to reduce the product of two numbers over a modular class. This is then applied to derive a new circuit for the hardware implementation of modular multiplication. This multiplication technique is then applied in the implementation of a proposed algorithm for Key Escrow.

The proposed alternative formulation of the Montgomery algorithm provides the basis for circuit architecture to implement modular multiplication. This is then applied to a class of circuits to multiply numbers within a range of modular classes. Circuits can be constructed to provide a very simple cell structure while taking advantage of existing cells and techniques for binary multiplication. The techniques described can further be used to accommodate easy changing of the modular base and to permit the multiplication of very large numbers using the circuit in a recursive manner. The circuit of the invention can serve as an alternative to existing implementations and has utility in systems such as those used in cryptography or in applications such as DSP where residue arithmetic is of some interest.

Requirements that distinguish Key Escrow (or Key Recovery) Systems from other cryptographic systems will be described and new techniques for addressing some of these unique requirements are also described. The escrow, or storage of keys in a key database allows for key recovery under prescribed circumstances. There are commercial requirements as well as governmental requirements for such systems. Unfortunately, in many instances, these involve conflicting requirements. This invention attempts to address the issue of access to a key database, and abuse of that access. Requirements of key storage protocols are considered. The concept of imposing a computational cost function for key withdrawal is described and implementation examples are developed.

This invention relates to restraining access to key information by the imposition of a computational work function. A computational work cost or delay is described based on the required performance of a large number of simple, measurable operations. This approach to implementing computational delay facilities uses the law of large numbers to draw conclusions on the expected delay. Subsequently, stochastically controllable delay parameters can be derived. The algorithm can be implemented in a general purpose computational environment without reliance on specialized hardware.

Results include an analysis of the stochastic performance of the proposed algorithm for implementing a controlled delay cost function. In the general case, the Chebyshev bound on the delay cost function for the described algorithm is derived. Examples of implementation, using commonly available cryptosystems as a basis, are presented.

This application describes aspects for the storage and retrieval of cryptographic keying material. The systems for key management is of central importance to cryptographic applications and to information systems in general. If data is to be stored long term using secure techniques, then the storage of associated keying material must also be considered. The long-term viability of employing cryptographic techniques in common applications relies in part upon the success of solving the problems associated with the distribution and storage of the associated keying material.

In accordance with the present invention there is introduced the concept of Limited One-Way Functions, which are used to create computational terms barriers. The invention utilizes functions that are strongly asymmetric in nature, in terms of work to compute and work to invert. This class of functions, however, is not required to be completely intractable, but alternatively should have some measurable difference in the amount of work required to invert, compared to the cost of calculation of the output of the function. The application of this invention to key escrowing is described. A basic algorithm for implementation as an example of a suitable limited one-way function is described. This problem involves randomization and can be viewed as an extension of the puzzling problem originally developed by Ralph C. Merkle, "Secure Communications Over Insecure Channels," Communications of the ACM, April 1978, Volume 21, Number 4, pages 294–299. The basic algorithm utilized in implementation of the invention requires a randomized response and achieves a limited, but measurable computational advantage of the data receiver over an eavesdropper. Algorithm performance and application to the implementation of a delay function for employment in key escrow systems is hereinafter explained.

Additionally the invention utilizes an enhanced version of the basic delay algorithm. This enhanced algorithm provides more computational advantage and is therefore more practically implemented. The enhancement is in the form of a multi-stage extension, multiplying the computational advantage. In describing the invention there is outlined the steps involved in the algorithm and provides an analysis of the amount of computational advantage achievable. This advantage can be quantified in terms of number of stages used, as well as the amount of randomization incorporated at each stage. This advantage, bounded by the complexity of the NP-complete difficult cryptosystems upon which the algorithm is based, can be grown at an exponential rate. A multi-stage algorithm provides additional degrees of freedom and added computational advantage over the basic algorithm.

Also considered in a description of the invention are required properties of information mixing functions that were specified in the algorithm previously described. These mixing functions serve to break down information structure prior to each iterative stage of encryption. The mixing functions serve a function that is somewhat analogous to the utility of mixing box functions typical to a classic symmetric encryption cipher. The suitability of several classes of functions for mixing information between encryption stages are described as related to the invention. The application of symmetric and public key cryptosystems to this purpose is described in one embodiment of the invention.

The preferred embodiment of the invention also describes an analysis of the stochastic performance of the multistage algorithm. Performance margins are derived through application of the Chebyshev bound. These are stated in terms of probabilities that the work required to reverse the escrowing process will vary from the expectation by a given amount. As the degree of randomization inherent in the process increases, this variance in performance can be made arbitrarily small.

The invention also relates to a technique for the multiplication of numbers from a modular class. This technique is based on a modified representation of the described Montgomery multiplication technique. The embodiment of the invention presents background material on techniques for modular multiplication using Montgomery's technique and an alternative formulation of the technique. This alternative formulation is used to define a new class of circuits for the multiplication within a modular field of numbers.

In accordance with the invention there is included a description of how RSA and DES can be applied to implement the multistage algorithm. Implications and limitations of application of these cryptosystems are considered. Additionally, a secure configuration management program is described for an understanding of the invention. A detailed outline of the protocol steps required to implement such a program is hereinafter described. A description is developed for each of the basic transactions required to create and manage the development and revision of documents controlled within a secure configuration management system.

The presented algorithms provide a methodology for restraining access to a Key Escrow database in terms of the delay cost function.

A process for withdrawing an encryption key from escrow, comprising: creating at an originator a set of N trap door functions each paired with a corresponding token, transmitting the set of N trap door functions to a receiver, randomly selecting at the receiver one of the trap door functions and the paired token, adding randomization information to the corresponding token of the selected trap door function, encrypting an escrow key with the randomly selected trap door function, transmitting the encrypted key to the originator, and decoding the encrypted key utilizing retained trap door information.

The process for withdrawing an encryption key as set forth above further comprising storing the encrypted key in an escrow database.

BRIEF DESCRIPTION OF THE DRAWINGS

A more complete understanding to the key escrow system of the present invention may be had by reference to the following detailed description when taken in conjunction with the accompanying drawings wherein:

FIG. 5 is a processor assignment map for pairing of multiplication terms in an interleaved modular multiplier;

FIG. 8 is an illustration of generic processor cell assignment;

DETAILED DESCRIPTION OF THE INVENTION

Figure 1:
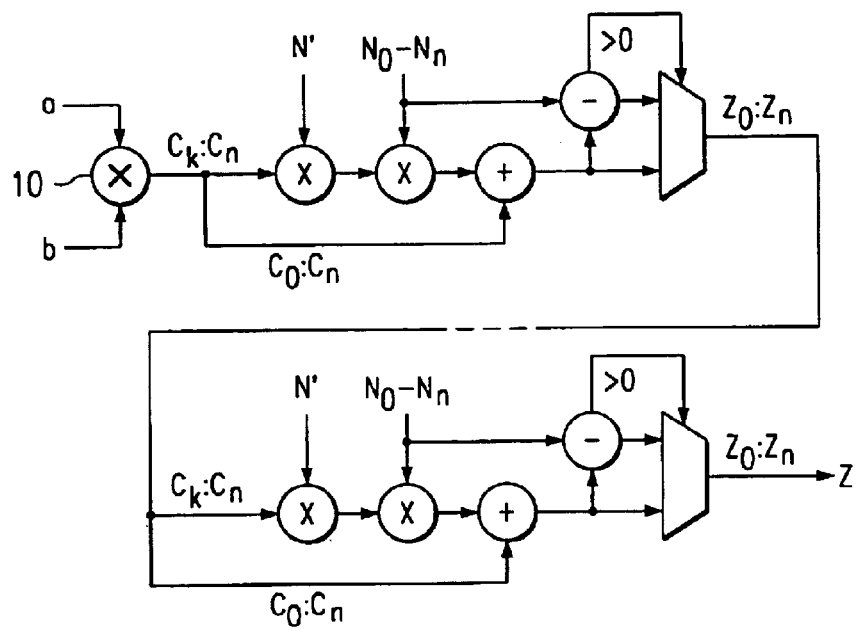
FIG. 1 is an unrolled loop representation of a modified Montgomery multiplier.

Normally, when the problem of key distribution is considered, the interest is in networks of processing or storage elements connected in some manner with communications channels. In some cases, channels used for key distribution are deliberately chosen to be secure, however, the channels of interest are those which are not secure and are thus subject to interception. Channels that might be used by the military or the government for the distribution of keying material would normally be secure (with some possible exceptions). Channels that might be associated with public usage may normally be insecure and hence the transfer of keying information requires a secure protocol. Thus, channels may be broadly categorized into private and public channels. A public channel is defined as a communications channel that is freely accessible or a channel whose access is not controlled. A private channel is defined as a channel whose intended use is restricted to a specific set of users and thus is privately owned by those users. A private channel may or may not be considered secure. Alternatively, public channels by definition cannot be considered secure. When considering a key distribution system, there is an inclination to think of a communications network or alternatively a computer network. However in general the concept can be extended to cover any type of element (including possibly a human) capable of effecting the transfer of keying information. A traditional secure channel for the delivery of military keying information has been hand delivery by trusted courier. It is possible to come up with the following categories of channels:

a) Public, b) private - insecure, and c) private secure.

Real world systems consist of mixtures of these types of information channels. The information that needs to flow inevitable consists of information that is important to protect and information that is not as important.

The processing elements may also be categorized. For the sake of convenience, the local processing element of a particular user is referred to as a client and those processing elements that are only reached by the user through a communications channel as a server. Each client may seek to protect data from intentional or otherwise examination by any or all of the other clients or other unauthorized users. This is true whether the data is transmitted over an insecure private channel or over a public channel. This does not apply to the case of a secure channel. A secure channel is one which is protected either by physical or cryptographic means. If the channel is secure then the data is protected because the channel itself is protected. Assuming that data requiring protection is encrypted in some manner using an encryption function and an encryption key then only the resulting cryptograms are transmitted over an insecure channel. By definition the raw data prior to encryption is referred to as plaintext and data that has been encrypted is referred to as secure. Data that is held by the client and not transmitted will be referred to as local and data that is transmitted without encryption is referred to as public. Thus it is desired that all data that a client wishes to protect is transmitted in the secure form.

To facilitate private communication between two parties over a communication channel, the transmitter must have an encryption key and the receiver must have a decryption key. In some cases these keys may actually be the same. These cases are referred to as symmetric cryptosystems. These keys must be a matched pair agreed upon by both of the two parties in some manner and the pair cannot be available to third parties. Thus, there is a requirement for the two parties to share some secret information without disclosure to a third party.

It is convenient to physically or logically partition a complete cryptographic system into various domains where information may exist either in a transitory or storage form. Thus such a domain may consist of storage elements, channels, or processing elements. Assuming for the time being that this information is successfully shared, there are three domains related to this problem. Domain 1 is the region within the transmitter where the data is in plaintext form awaiting encryption. Domain 2 is the domain where the data is only found in secure form. This includes the transmission channel from the transmitter to the receiver. Thus the data crosses from Domain 1 to Domain 2 prior to transmission on the channel. Finally, Domain 3 is the region within the receiver where the decryption key has been applied to convert the data back to plaintext. Note that it is necessary for the transmitter to provide security for Domain 1 and it is necessary for the receiver to provide security for Domain 3. A complex communication network is normally made up of many such receiver/transmitter pairs. Each, in general, requires an independent set of encryption/decryption keys.

Data that is to be protected must have the encryption key applied to it as it transitions from Domain 1 to Domain 2. This also indicates that users or other possible observers must not be able to gain physical or electronic access to Domain 1 because in this domain all of the information is in plaintext form and is easily readable. It shall be assumed that a protected domain such as required here is establishable.

In general there are two basic approaches to provide cryptographic security, informational and computational. Informational security is provided by a system when there is insufficient information available to construct the plaintext without the keying information irrespective of the amount of computational power applied. The classic example of an informational security system is Vernam's One-Time Pad. Computational security is based on the notion that the decryption process is computationally intractable without possession of the decryption keys. Most practical cryptographic systems are based oh computational security.

When referring to computational security, relative security can be judged in terms of the economic cost as a function of the amount of work (or time) involved in breaking of the cipher. This cost function can be measured by the number of operations required to break the algorithm in an efficient manner. The subject area of complexity theory deals in part with just how difficult problems (such as these) are to solve, at least in the worst case. While it is often not difficult to get upper bounds on the complexity of solving problems, it is another matter, altogether, to get a meaningful lower bounds. This is especially true because classes of problems that are extremely difficult to solve for many instances will have certain values or subsets, which are easily solved. Thus, while the algorithm may be generally strong, there are poor choices, which provide avenues for easy exploitation. For most classes of problems of interest in cryptographic applications there are not provable well defined lower bounds. This is a recognized weakness especially of public key algorithms based on discrete mathematical functions.

The methodology of the present invention uses characteristics of public keys systems, applied to a newly proposed generalization to a work originally done by R. C. Merkle in a 1978 paper. The present invention utilizes a cryptographic algorithm intended to provide a robust back door path, while affording a novel "front-door" path for controlled access. A randomization technique generalizing Merkle's idea is used to provide a parameterized amount of work to go through the front door. By making use of a large amount of randomization, $O(N^k)$, the law of large numbers can be applied to the solution algorithm to require an average amount of work per solution, rather than relying on a perhaps unknown lower bounds on one problem solution. At the same time, a reasonable amount of work, $O(N)$, is required to normally communicate the keying information. The result is the generation of a candidate function for a limited one-way function, one that provides an asymmetric transfer cost function in both directions.

By controlling both parameters N and k and the size of the randomized encryption problem, the amount of work required to break or retrieve the cryptogram through the front door path is controllable. Thus, the price can be specified within certain bounds for breaking the cryptogram and hence solving the problem of escrow key retrieval in a manner to match given bandwidth requirements. What will be described is a cryptographic system whose access cost is easily controllable and can range in difficulty from the simple to prohibitively difficult by adjusting the defining parameters of the algorithm. This can serve as an effective basis for the construction of Key Escrowing systems that afford varying degrees of data access and retrievability. This ability can be afforded to different classes of users while maintaining cryptographic security against unauthorized access. The system of an embodiment of the invention effectively provides practical limitations that preclude systematic patterns of abuse by otherwise authorized agents or clients. This technique is applied to the problem of public key escrowing systems or Mandatory Key Escrowing (MKE) systems.

A Key Escrowing system refers to a component of a large, distributed data management or communication system, which is used to store cryptographic keying material, in a controlled manner for later retrieval. Commonly the term is used to refer to systems that are designed to permit third party access to keying information under controlled circumstances.

A Key Escrowing system is fundamentally different from cryptographic systems based on zero-knowledge techniques such as some password or authentication systems. A Key Escrowing system must provide a withdrawal capability rather than simply verification. A Key Escrowing facility, agency, or bank is responsible for the cataloging of all deposited keys. Keys that are stored by the escrowing agency are referred to as deposits and can use the term account to refer to the set or collection of deposits associated with a particular device or client. The ability to be able to associate deposits is required to cover possibilities where a particular client requires multiple keys or replacement keys. Unlike many other commodities associated with economic value, keys may be freely replicated and yet each copy retains the same economic value as the others. Once duplicated, all copies must be equally protected. The security of any and all copies of a key is that of the most weakly protected. This concept is very important when considering the security of a key bank. The value of the keys stored therein is equal to the sum of all the distributed keys. Thus for any kind of a national escrowing system, the potential economic value of such a bank would be truly enormous.

There are limited opportunities to impose restraint on abuse of access to a key escrow database. These include:

spreading the key information across multiple authorities or agencies, escrowing only part of the key information, protocol or procedural measures, machine or hardware imposed limitations, time limitations on useful life of keys, impose cost barriers on key withdrawal.

The last of these is specifically addressed by the present invention.

It is apparent that, for such a system, what is required is a self-limiting or self-regulating algorithm to preclude the potential for wholesale abuse. Since keys are very frequently created (deposited), but rarely withdrawn, there is an inherent asymmetry to the problem. If it is as easy to withdraw keys as it is to deposit them, then there is every possibility that keys may be withdrawn at an unreasonably excessive rate. It is therefore desirable to have a system that inherently limits the rate of withdrawals to a pre-defined maximum rate. This provides an inherent deterrent against a specific threat profile, that of the "casual key browser."

The most likely scenario for abuse lies in the realm of directed assaults where a specific account is targeted for access by improperly authorized parties. However, perhaps a greater threat is that the properly authorized parties will abuse their power in some wholesale manner. This is one important aspect of the key escrowing problem. A security threat concentrated and directed at specific individuals is a difficult problem to deal with but can be addressed by way of escrowing protocols and audit trails. However, a separate and perhaps greater danger to individual freedom is the anonymous and random monitoring of citizens without probable cause or due process of law.

A technical advantage of the present invention is the feature of a specific cost associated with each key withdrawal from a Key Escrowing depository. This then means that one may not simply randomly browse, without penalty, among what is in principle a very large data base of keys, but must in general request specific keys to be withdrawn. The described embodiment is a limited one way function applied within a key escrow system to implement a cost of withdrawal function. The computational cost of key withdrawal greatly exceeds the cost of deposit. Although this may not, in of itself, prohibit an authorized individual from asking for additional keys. However, the numbers would be inherently self-limiting. Additionally, any continuing pattern of such behavior would be statistically detectable, since the cost (on average) for systematically requesting additional keying information would be detectable.

Traditional electronic approaches to the storage of vital key information have normally involved keeping copies of keys in a trusted database, protected by one or more master keys. This master key is therefore more valuable than the other keys and is at least as important as the sum of all of the protected keys. Consequently, anyone in possession of a master key would be afforded complete and unlimited access to all of the information protected by all of the sibling keys stored using the master key. The advantage of having a master key is that there is only one key of which to keep track. The chief disadvantage is that a master key constitutes a single point defense. Compromise of a such a master key is therefore very critical. A single key database can be compromised by anyone in possession of the master key material.

It is therefore desirable to segregate data into multiple master key domains. This of course has the undesirable property of multiplying the number of master keys which must be safeguarded or protected in of themselves. Ultimately these keys are protected in much the same manner as a single master.

There have been suggestions that solve this problem by using secret splitting techniques to provide complementary components for each key stored. These complementary components would have to be put together to recover the original key. Components would be separated at time of creation and stored with alternate "trusted" agencies. These techniques not only offers protection from external attack on the database but also some protection from abuse from within a particular trusted agency. These systems are inadequate in that they do not address concerns over the possibility of collusion between individuals within the agencies with access to the databases. It is recommended that additional measures are necessary to discourage abuse of the system and to provide additional opportunities for oversight.

Integer arithmetic operations in prime modular fields are of great interest in a variety of fields. Modular multiplication is of central importance to technologies such as cryptography, Digital Signal Processing (DSP), and fault-tolerant computing.

In cryptography, the multiplication and exponentiation of large integers is fundamental to the implementation of many cryptographic algorithms. For example, public key cryptosystems such as the popular RSA cryptosystem are based on the operation of exponentiation and the corresponding intractability of computing discrete logarithms in a large finite field. Performance demands on encryption systems are constantly increasing, resulting in a growth in key sizes required to maintain security. Indeed, it is increasingly evident that cryptographic key sizes are required that exceed five hundred bits. Calculations based on these key sizes must be performed in an economic manner. Recent results indicate that RSA key sizes of five hundred bits are now vulnerable. Many cryptographic applications are implemented in software. However, it is now the case that hardware implementations are of interest for higher performance ard greater throughput. It is desirable, for example, to provide strong encryption in real time for applications such as telecommunications. Performance issues are of primary concern in these applications.

Applied to residue number systems, modular multiplication over finite fields is important in areas such as Digital Signal Processing (DSP) and fault tolerant processing. A primary interest is to perform large bit-size multiplications very quickly. Residue numbers attract interest due to the absence of carry propagates from digit to digit within the residue number system. Residue number systems also allow for easy implementation of redundant representations of numbers in an efficient manner. This facilitates the implementation of fault tolerant systems.

It is important to develop temporally and spatially economic implementations. One computationally efficient technique for the implementation of modular multiplication was first outlined by Peter Montgomery in 1985. Since that time, there have been a variety of both software and hardware implementations of modular multiplication using Montgomery's idea. While Montgomery's technique is not the only method available for implementation of modular multiplication, it is very efficient. It is also utilitarian in that it provides an elegant method for transforming the multiplication problem from the prime field, where the calculation is difficult to perform in hardware, to a binary field, where it is more easily accomplished.

Montgomery's technique provides a convenient conversion from a residue class modulo N to a larger class modulo R, where R is co-prime to N. Additionally, R is chosen to be a field such that the operation of multiplication is easy to accomplish, whether in hardware or software. It is consequently convenient to select this field to be a binary field and therefore R=2r, where r is the number of bits in R. Thus, if N is prime or the product of primes (not including the number 2), this satisfies the co-prime requirement. To perform the conversion requires defining two parameters, $N_c$ and $R^{-1}$, such that the following relationships hold:

$$0 < R^{-1} < N,$$

$$0 < N_c < R,$$

and $$RR^{-1} - NN_c = 1.$$

Conversion from an integer, x, to a N-Residue number involves computing xR mod N. Conversion back to an integer requires multiplication by $R^{-1}$ mod N. The key to Montgomery's technique is a reduction algorithm that allows efficient computation of a number $xR^{-1}$ mod N from x. The reduction algorithm, as stated by Montgomery, is given by:

function Reduct (X R, N, $N_c$)
begin
   m:=((X mod R)*$N_c$)mod R;
   x:=(X+m*N)/R;
   if x>N then x:=x−N; end if;
   return x;
end Reduct;

The choice of R as a binary field greatly simplifies several algorithm steps. In the first step of the operation, it is necessary to perform two modulus operations with respect to R. With R being a binary field, the modulus operation consists simply of discarding all but the r least significant bits. In the second step, a division by R is required. Since R is a power of two, the operation of division simplifies to the discarding of the r least significant bits of the argument. This results in a highly efficient realization in hardware. Consequently, the algorithm reduces to a small number of simple operations that lend themselves readily to direct translation into hardware.

The number transformation from the residue number system to the binary system (and back) can be accommodated in one of several manners. It is possible, for instance, to directly compute xR mod N from the integer x by multiplying by the constant R and then doing the modular reduction. Alternatively, the same result can be arrived at by computing Reduct ((x mod N) ($R^2$ mod N)) which turns out to be more efficient. The application of this technique precludes the necessity of directly computing the modular reduction.

Note that in Montgomery's original work, the conversion to the residue system is achieved as previously described. This involves pre-multiplication by $R^2$ mod N. It is possible, however, to forego the pre-multiplication, and instead to post-multiply by $R^2$ mod N, followed by another application of the reduction algorithm, or to even consider leaving the number in the R-Residue form. The later method is an approach frequently taken in practical implementations of the technique. When discussing implementation of the algorithm it is necessary to consider which approach is assumed.

To perform multiplication, the reduction algorithm is applied directly to the product of two numbers, A and B. Application of the reduction algorithm, as described above, has the effect of removing a factor of 1/R from the input to the algorithm. When converting back, a post-multiplication by $R^2$ mod N is required, followed by another round of reduction which reduces the size of the result again and removes the second factor of R. The term, $R^2$ mod N, can be a pre-computed constant. It is normally considered not to be cost effective to convert each result back to the original number system, but rather to perform a number of operations (such as in exponentiation) prior to conversion. There is motivation whenever practical. This avoids the back-conversion cost.

The previous description outlined the basic approach to applying the Montgomery technique for the derivation of interleaved multipliers. Instead of calculating the N-Residue xR mod N, and then decomposing R into individual digit operations, consider the following transform, $xR^k$ mod N. The instance where k=2n was initially described, this procedure is referred to as the Modified Montgomery Algorithm and outlines the procedure to perform exponentiation. The more general theory that lies behind these results is described as part of the statement of the invention and will subsequently describe methodologies to derive a class of concurrent modular multiplication circuits. These details include a generalized circuit of the algorithm. An alternate embodiment for the k=2 case (binary digit operation case) is contrasted to other comparable existing implementations.

Using algorithm Reduct as before, these results Reduct((x mod N)($R^{k+1}$ mod N))=$xR^k$ mod N. Previously, in the description of the basic Montgomery Technique, it was required that:

R>N,

If R<N is chosen instead, then the outcome of the reduction operation would not be reduced to the range –N<x<N. Choosing R<N, the algorithm may be applied multiple times in an attempt to reduce the outcome down to the proper range. It is indeed possible to reduce the result to the desired range by recursive application of the reduction algorithm. Each application of the reduction algorithm introduces a factor of $R^{-1}$. If recursive application of the algorithm requires k rounds of reduction, meaning that the reduction algorithm is applied k times, then to transform back to the original integer number system now requires multiplication by $R^k$ mod N.

This formulation appears similar to the approach of taking the residue R and decomposing into k digits of size r so that $r^k$=R. However, there is a difference in the implementation. The common practice of subdivision of R into digits facilitates the interleaving of the addition and multiplication steps. The definition in the original Montgomery Algorithm assumed a value of R greater than the modulus, N. Relaxation of this constraint and recursive application of the reduction algorithm permits derivation of a result analogous to that of the digit decomposition approach. If the reduction algorithm is applied once, the resultant output of the reduction operation is not reduced down to the range –N<x<N. To further reduce the result, the algorithm can be applied recursively. Consequently, it is possible to reduce the outcome to the proper range by recursive application of the reduction algorithm. Each application of the reduction algorithm reduces the range of the outcome by a factor of 1/R. The number of times that the algorithm must be applied recursively is determined by the size of R relative to the size of N. Each application of the reduction block removes a factor of 1/R from the result. It is therefore necessary to either pre-multiply or post-multiply by a factor or $R^{k+1}$, where k is the number of rounds of reduction required. While functionally similar to the decomposition into digit operations, this recursive process implies an alternate sequence of operations. The resulting recursive loop is described as:

function RecursiveReduct(X, R, N, $N_c$)
    for i in 0 to k–1 loop
        $X_0$:=((X mod R)*$N_c$)mod R;
        X:=(X+$X_0$*N)/R;
        if X>N then X:=X–N; end if;
    end loop;
    return X;

This procedure therefore describes the general format for the Modified Montgomery Multiplication algorithm, expressed as a recursive loop. A block diagram showing the unrolled loop is depicted in FIG. 1.

In the modified algorithm, the transform is performed to a field of size $R_k$ rather than R, while still performing operations modulus R. Consider the following derivation for the multiplier, let the two inputs to the multiplier 10 be a and b. To convert to an R-Residue number, perform the transform $$a'R = R^k a + (((R^k a \bmod R)N_c) \bmod R)N.$$

Therefore $$a'R = R^k a \bmod N.$$

Multiply both sides of this expression through by $R^{-1}$ mod N. By definition, $R^{-1}$ R mod N=1. Subsequently:

$$a' = R^{k-1} a \bmod N.$$

Multiplying a' by b together, a value is determined to use for the inverse transform to convert the result in the R-Residue number space back to integer form. First, the product is obtained, $$c = a'b = R^{k-1} ab \bmod N.$$

The inverse transform can be defined as $$z = \text{REDUCT}(R^{k-1} R^{-m} ab).$$

Therefore $$zR = R^{k-1} R^{-m} ab \bmod N.$$

Alternatively, $$z = R^{k-m-2} ab \bmod N.$$

Therefore, the following relationship is obtained for the coefficient m:

$$m = k-2.$$

The special case of k=2 results in a value of m=0 and corresponds to Montgomery's original result.

The advantage of the application of higher order terms to Montgomery's multiplier techniques is that it conveniently enables the use of values for R that are in fact smaller than the size of N. Individual operations are performed in the smaller field. First, apply Montgomery's reduction algorithm as before, however, now let the input be of the form, $x(R^k \bmod N)$. Thus, to calculate the result of $\text{Reduct}(X(R^k \bmod N))$ and following the previous notation, the intermediate terms are:

$$m = (X*(R^k \bmod N) \bmod R)*N' \bmod R,$$

and $$t = (X(R^k \bmod N) + mN)/R.$$

These intermediate values are both well defined for all values of R. If R<N, however, the Reduct algorithm does not reduce the output, t, to the range 0<t<2N. However, if the initial multiplier is a higher order power of R, a secondary application if the Reduct algorithm is applied following the multiplier, recursively. Each recursion, in effect, removes one power of R. If the power of R (and hence the degree of recursion) is chosen appropriately, then recursive application of the algorithm a corresponding number of times will result in reduction of the number to the appropriate range. This permits the number of bits in the field defined by the number R to be reduced.

It is possible to view the Montgomery algorithm in terms of a combination of the multiplication and reduction operations into one combined operation. To apply Montgomery's R-Residue idea to the problem of multiplication, consider the multiplication of two n-bit numbers A and B, where the corresponding integers A, B $\in \{0, 1, 2, \ldots N-1\}$. Let X=A*B. The function REDUCT(X) is therefore computed by:

function Reduct (A*B, R, N,$N_c$)
begin
   m:=((AB mod R)*$N_c$)mod R;
   X:=(AB+m*N)/R;
   if X>N then X:=X−N; end if;
   return X;
end Reduct;

The principle behind the interleaved approach is to combine, at the single digit level, the operations of the reduction function, and the multiplication. This function can be re-written as a series of bit operations. The numbers A and B are both modulo N numbers and hence require n binary bits. Writing B as the binary sequence $$B = \sum_{i=0}^{n-1} B_i 2^i,$$

the multiplication of A and B can be written as $$AB = A \sum_{i=0}^{n-1} B_i 2^i.$$

The product, Without reduction, requires 2n bits. The quantity AB mod R, however, requires only the least significant r bits.

The term m*N from the Reduct function is written similarly as $$mN = m \sum_{i=0}^{n-1} N_i 2^i.$$

Calculating the term, X=AB+mN from the reduction algorithm described above, there is obtained:

$$X = A \sum_{i=0}^{n-1} B_k 2^k + m \sum_{i=0}^{n-1} N_i 2^i = \sum_{i=0}^{n-1} (AB_k 2^k + mN_i 2^i).$$

These relationships can be inserted into the Reduct algorithm above, and then used to develop the following recursive, digit level representation of the algorithm.

function ModMul (A, B, N)
X:=0;
for i in 0 to n−1 loop
   m:=$X_0$; c:=0;
   for j in 0 to n−1 loop
     $X_j$:=($X_j$+m*$N_j$+$A_i B_j$+c)mod 2;
     c:=($X_j$+m*$N_j$+$A_i B_j$+c)div 2;
   end loop;
   X:=X/2;
end loop;
if X>N then X:=X−N; end if;
return X;
end Reduct;

In this algorithm, the bit vector X is used for local term storage. The numbers X and N are implemented as r-bit vectors, since all operations with them are performed in the field R. A carry propagate term, c, represents the inter-loop propagate between increasing weighted power terms. The variable m in this algorithm is used to hold the value of the least significant bit of X. This value is multiplied across the entire row of bits and therefore needs to be saved since $X_0$ is overwritten.

Figure 2:
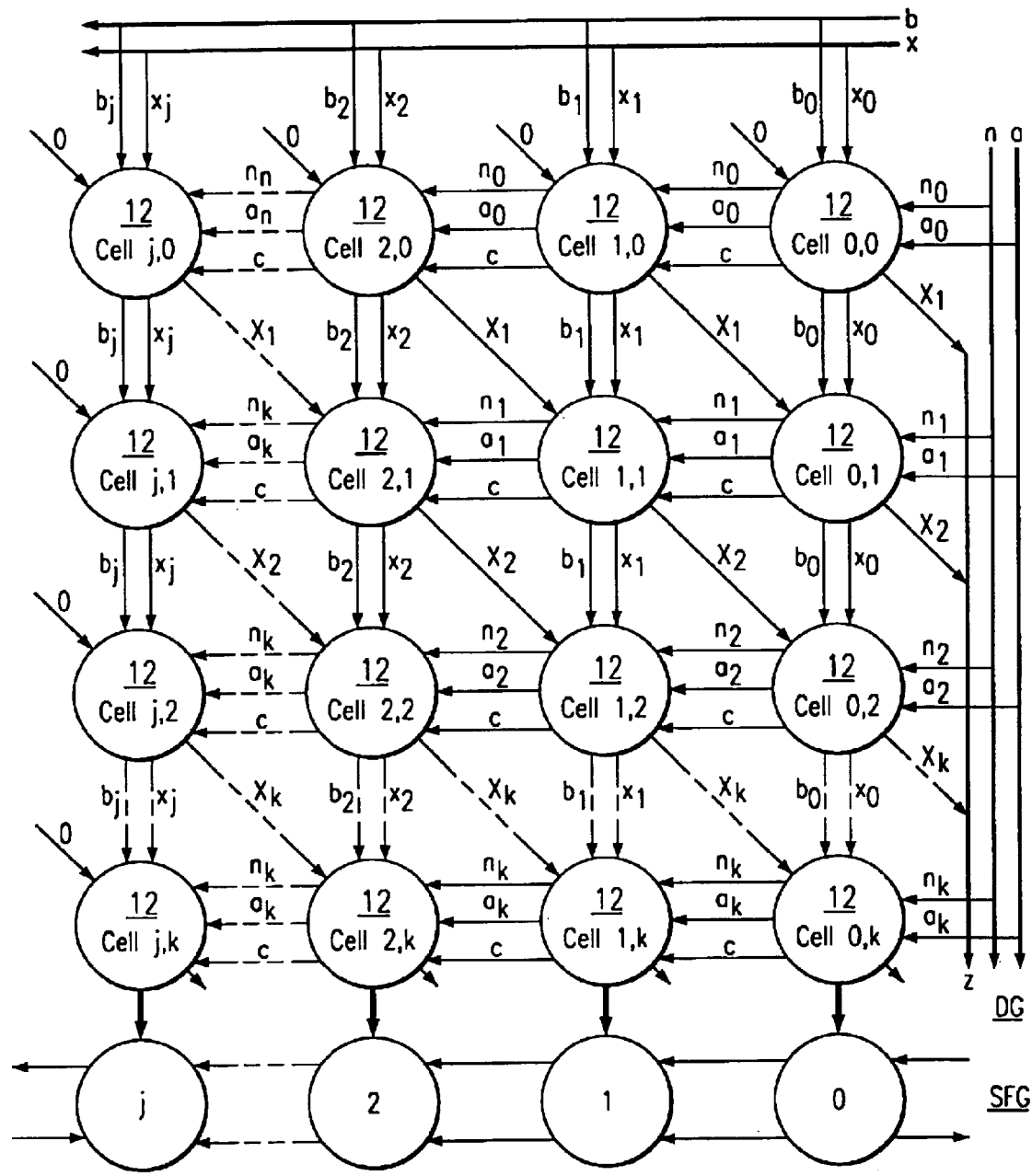
FIG. 2 is a representation of a data dependency graph (DG) of an algorithm for interleaved multiplication.

This algorithm can be viewed in terms of its representation by a data Dependency Graph (DG) as depicted in FIG. 2. This diagram depicts a time independent representation of the flow of information within the system. This DG represents one possible method for the interrelationship of input to output information in the form of a specific algorithm. Therefore, the portrayed DG represents one possible realization for performing the modular multiplication algorithm. This particular representation illustrates cells 12 where all the connections are related locally. In this case, all connections between cells are nearest neighbor connections and there are no globally bussed signals.

For the DG illustrated in FIG. 2, the input to output transfer relationships can be written for a generic multiplier cell as:

$$X_{out} = (X_{in} + x_j * n_i + a_i * b_j + t_{in}) \bmod 2,$$

$$c_{out} = (X_{in} + x_j * n_i + a_i * b_j + t_{in}) \text{div } 2,$$

$$x_j = X_{in} \bmod 2,$$

$$a_{out} = a_{in},$$

$$b_{out} = b_{in}$$

$$n_{out} = n_{in}$$

Figure 4:
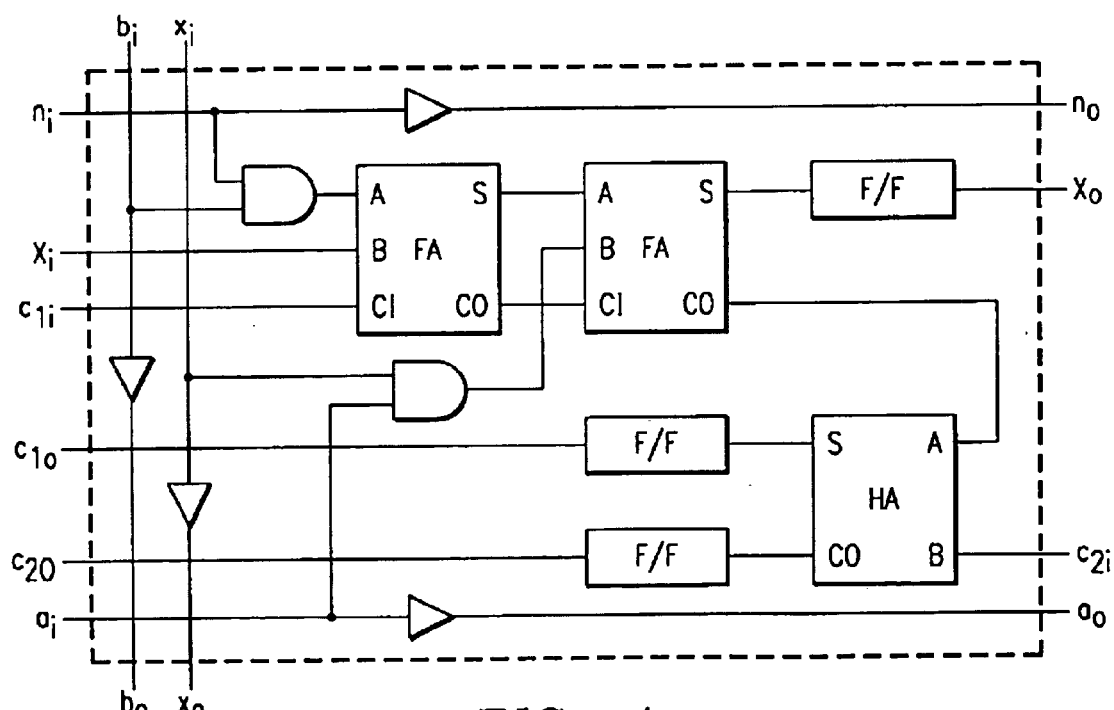
FIG. 4 is a circuit diagram of an interleaved multiplier.
Figure 3:
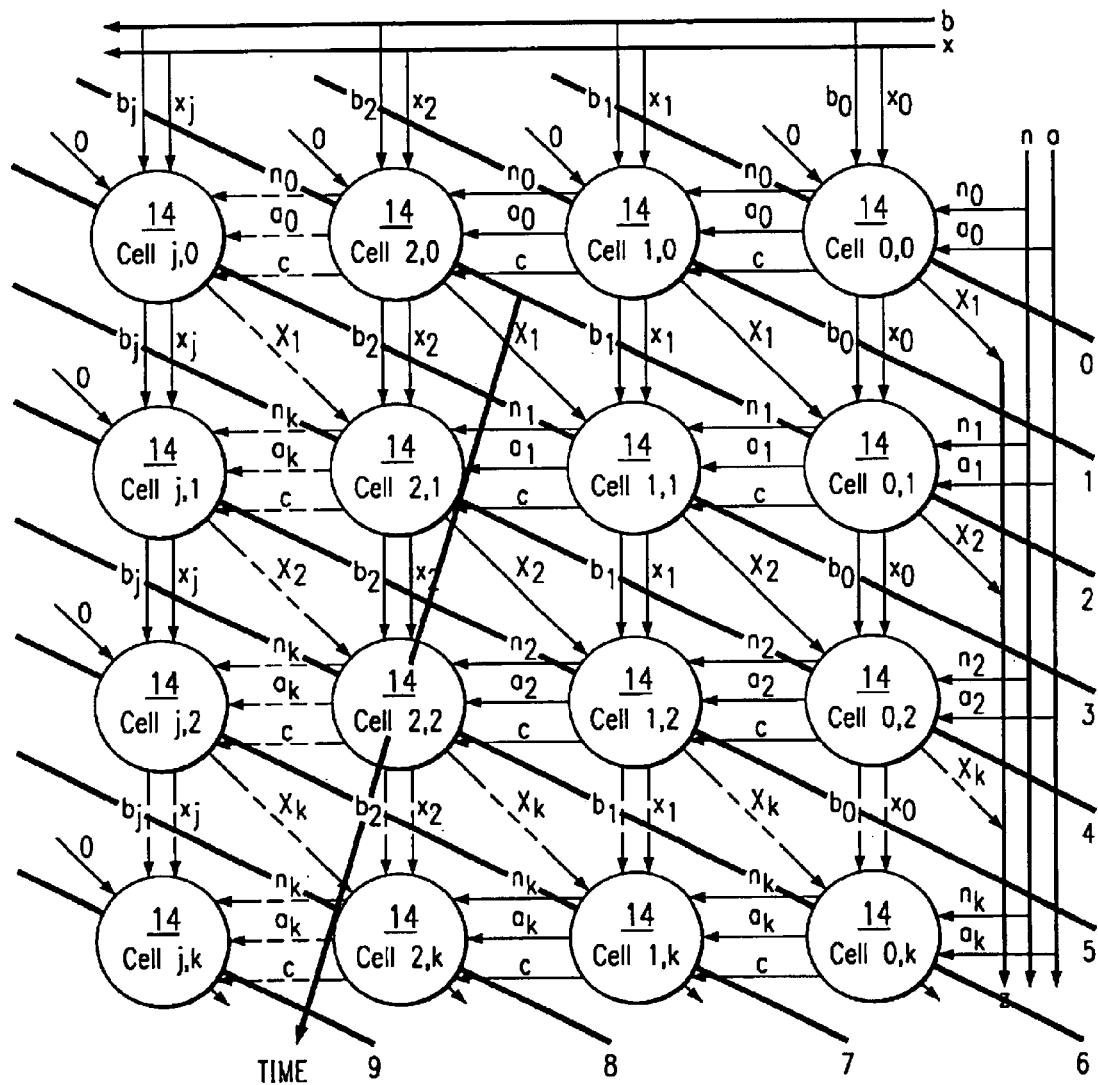
FIG. 3 is a scheduling diagram of an interleaved multiplier.

Due to the regularity of the array of operations, the DG can be projected onto a linear systolic array circuit realization. This is further illustrated in the form of a signal flow graph connecting this array of processor elements. FIG. 2 portrays one specific projection from the DG onto Signal Flow Graph (SFG). By mapping the DG onto a set of processing circuit elements, a hardware implementation of the algorithm can then be realized. Once mapped, it is then possible to make a determination of a schedule (time sequence) projection for the DG as shown in FIG. 3. The schedule projection describes the operations or occupancy of cells 14 in time. The simplest assignment of DG cells to physical cells is simply to assign the cells from a two dimensional dependency array projected onto a linear array of physical computational cells. The corresponding circuit realization obtained is depicted FIG. 4.

Figure 6:
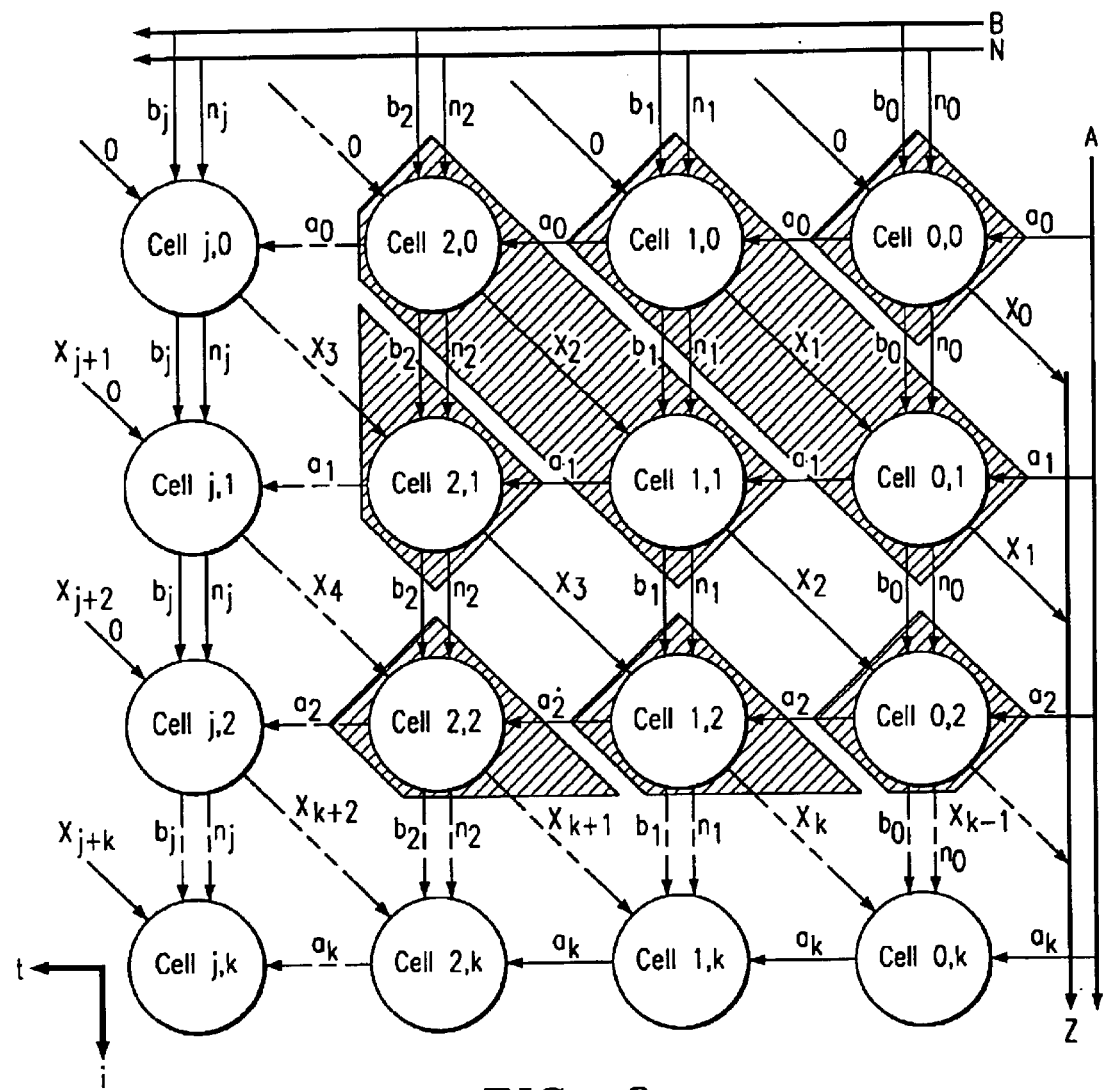
FIG. 6 is a mapping of a dependency graph format applied to processor cells.
Figure 7:
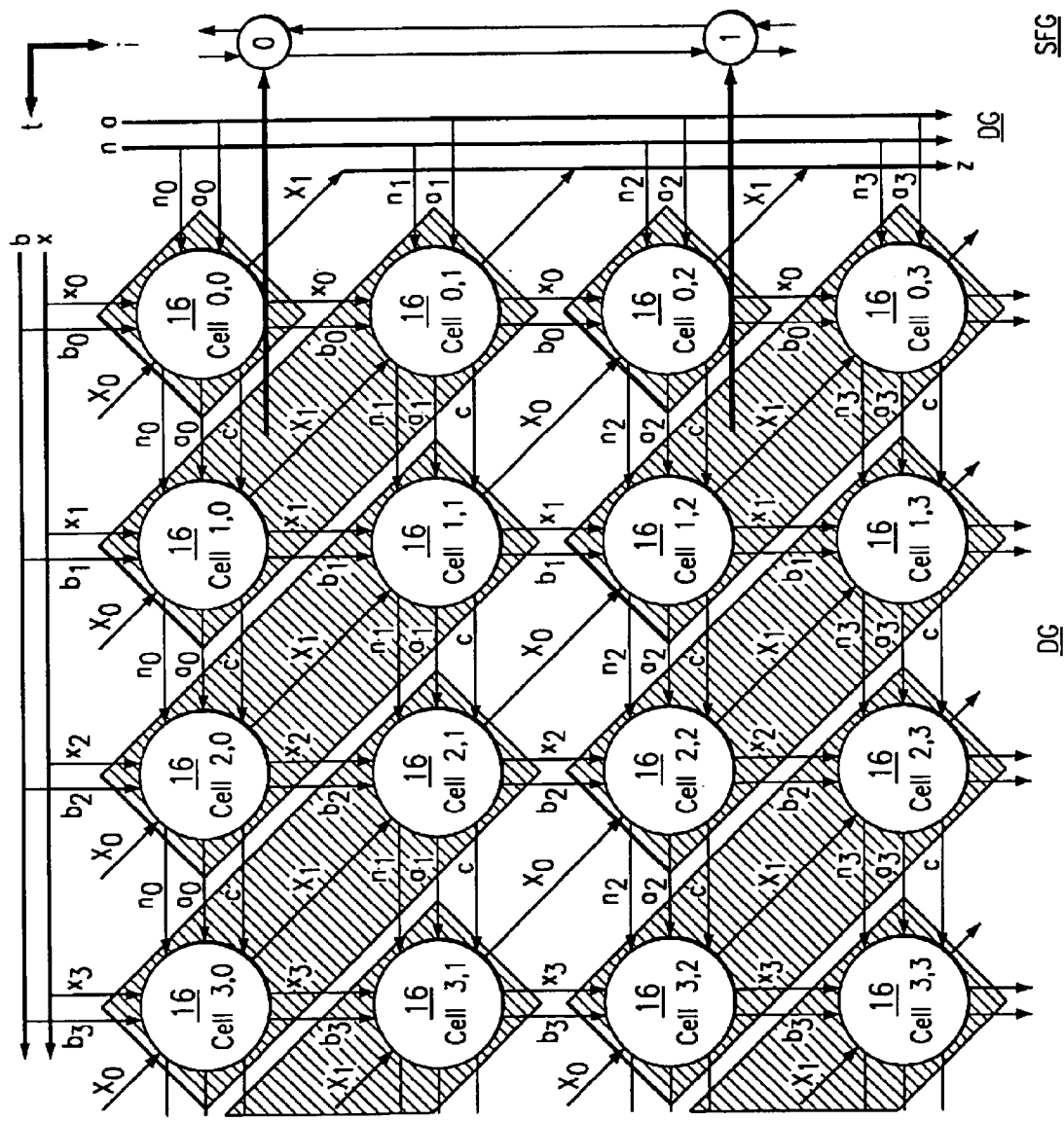
FIG. 7 is a scheduling diagram of a projection of a dependency graph into a signal flow graph.

It is possible to consider other mappings and the corresponding circuits that result from these mappings. An alternative implementation, based on the same DG mapping, maps two groups of DG cells such that two product terms of equal weight are added within one processing element of a systolic array. The described schema for the pairing of multiplication terms is shown in FIG. 5. For comparison to the previous implementation, this method is illustrated in DG form by reference to FIG. 6. This leads directly to the schedule diagram of operations shown in FIG. 7 where the DG individual processing cells 16 are highlighted. Each highlighted rectangle represents one cell of a systolic array at a specific time. Inspecting the figure in detail, it can be seen that a specific cell is repeated right to left (representing time intervals). Individual cells in the graph are instantiated sequentially from top to bottom.

Figure 9:
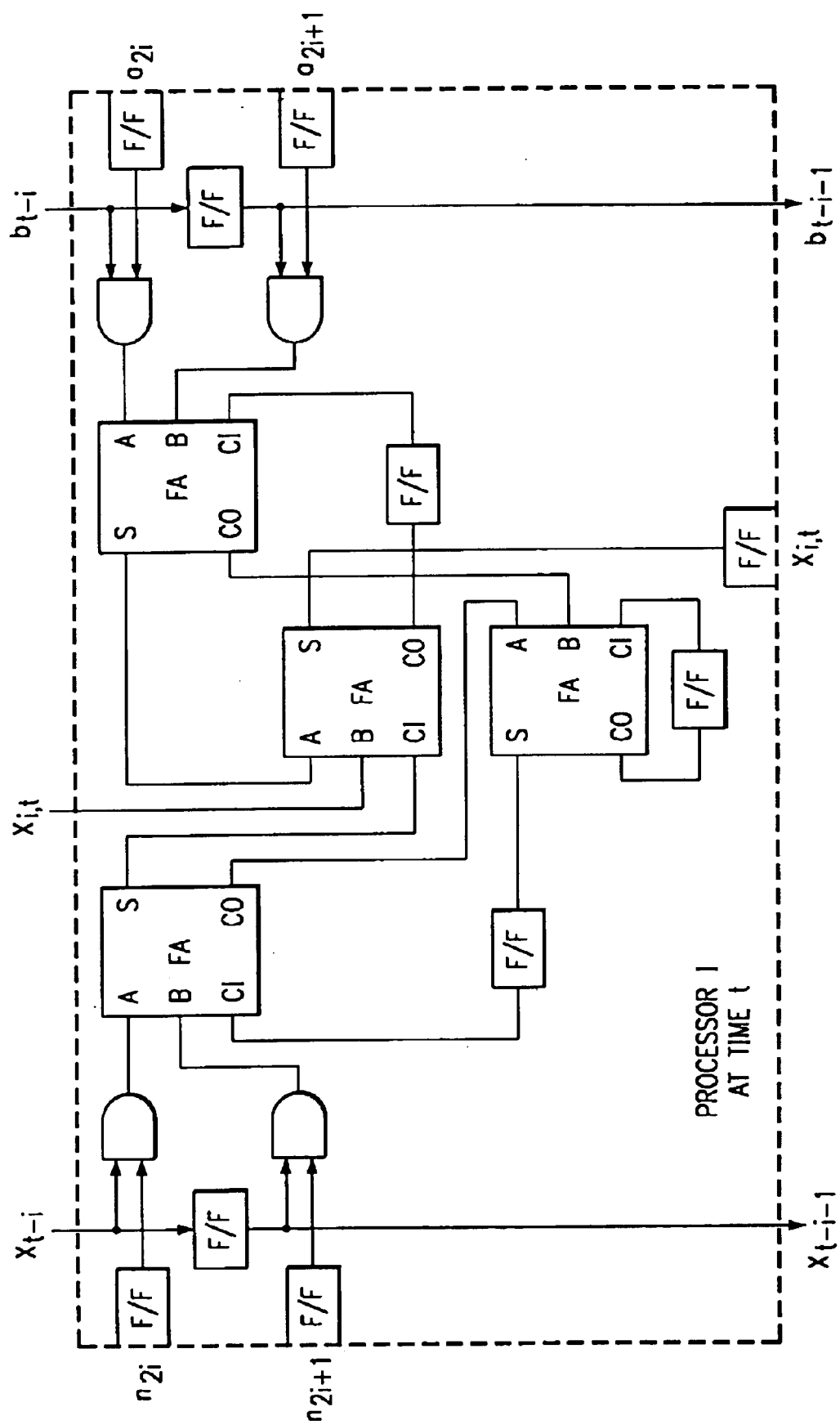
FIG. 9 is a circuit diagram of an interleaved multiplier utilizing four full adders within a single cell.

Once these assignments are made, then it is possible to construct the circuit realization. Changing from the absolute DG cell coordinate system of FIG. 6 to a coordinate system relative to processor ID and time, the result is the general processor cell 18 depicted in FIG. 8. The circuit realization of this cell, as shown in FIG. 9, is then implemented using four full adders within the single cell. All cell-to-cell terms are registered and hence do not require globally bussed signals.

Instead of calculating the N-Residue xR mod N, and then decomposing R into individual digit operations, consider the following transform, $xR^k$ mod N.

As before, using algorithm Reduct, the result is Reduct((x mod N) ($R^{k+1}$ mod N))=$xR^k$ mod N. Previously it was required that R>N. As an alternative, chose R<N, then the outcome of the reduction operation would not be reduced to the range –N<x<N. As described for the Modified Montgomery approach, the algorithm can be applied multiple times in order to reduce the outcome down to the proper range. Each application of the reduction algorithm reduces the range of the outcome by a factor of 1/R. Subsequently, the number of times that the algorithm must be recursively applied is determined by the size of R relative to the size of N. Since each application of the reduction block removes a factor of 1/R from the result, it is necessary to either pre-multiply or post-multiply by a factor of $R^{k+1}$, where k is the number of rounds of reduction required.

To transform back to the original number space requires multiplication by a factor of $R^k$ mod N, hence it is normally the practice to do a number of operations in the residue system prior to conversion back to the original integer representation. If recursive application of the algorithm requires k rounds of reduction, meaning the application of the reduction algorithm k times, then to transform back to the original integer number system requires multiplication by $R^k$ mod N. Note that in this definition, k does not represent the digit size. Choosing R<N implies that the field transformation maps N into a smaller field, in which case, the representation of numbers from N would not be unique. It is consequently necessary to consider the transform to be into the field $R^k$ which is larger than N.

Figure 10:
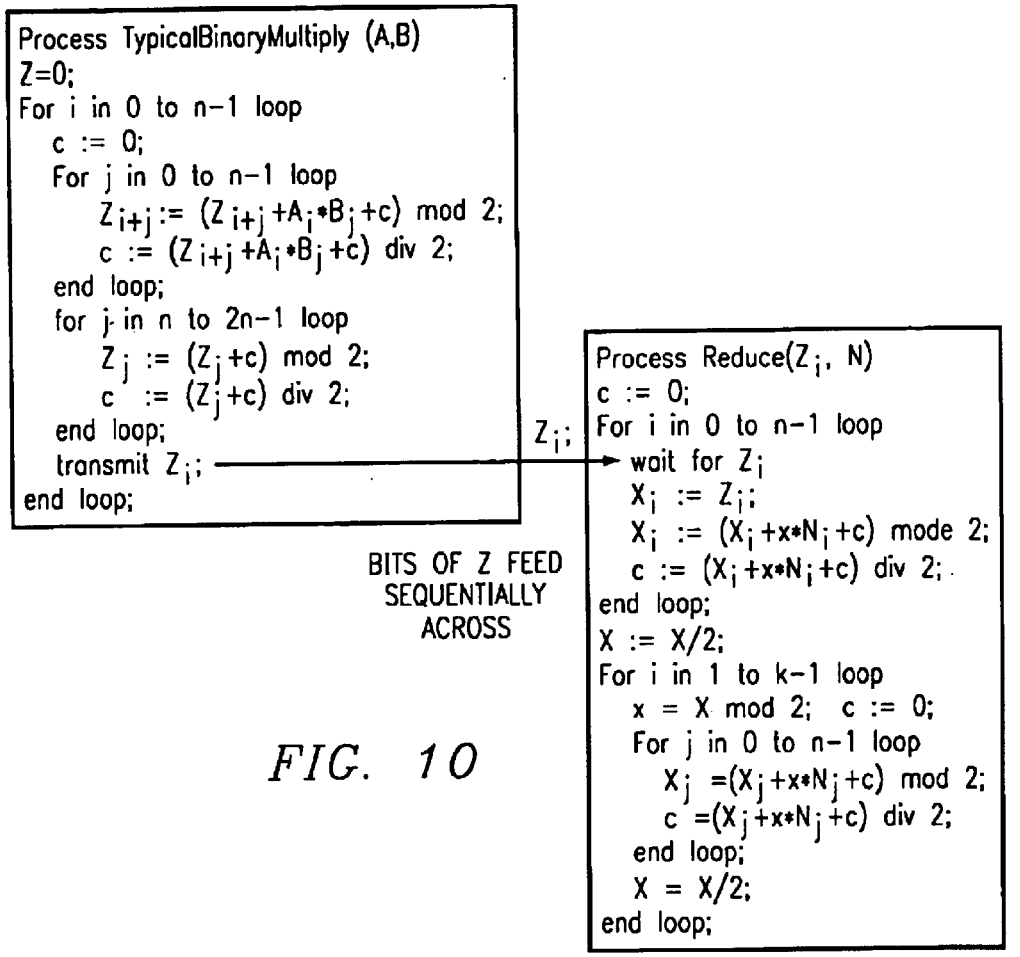
FIG. 10 illustrates an algorithm for concurrent multiplication in a modular multiplier consisting of two concurrent processes.

This formulation appears similar to the commonly used approach of taking the residue R and subdividing it into k digits of size r so that $r^k$=R. However, there is a difference in the implementation. While functionally similar, this process results in a difference sequence of operations. This algorithm is thus as depicted in FIG. 10.

Figure 11:
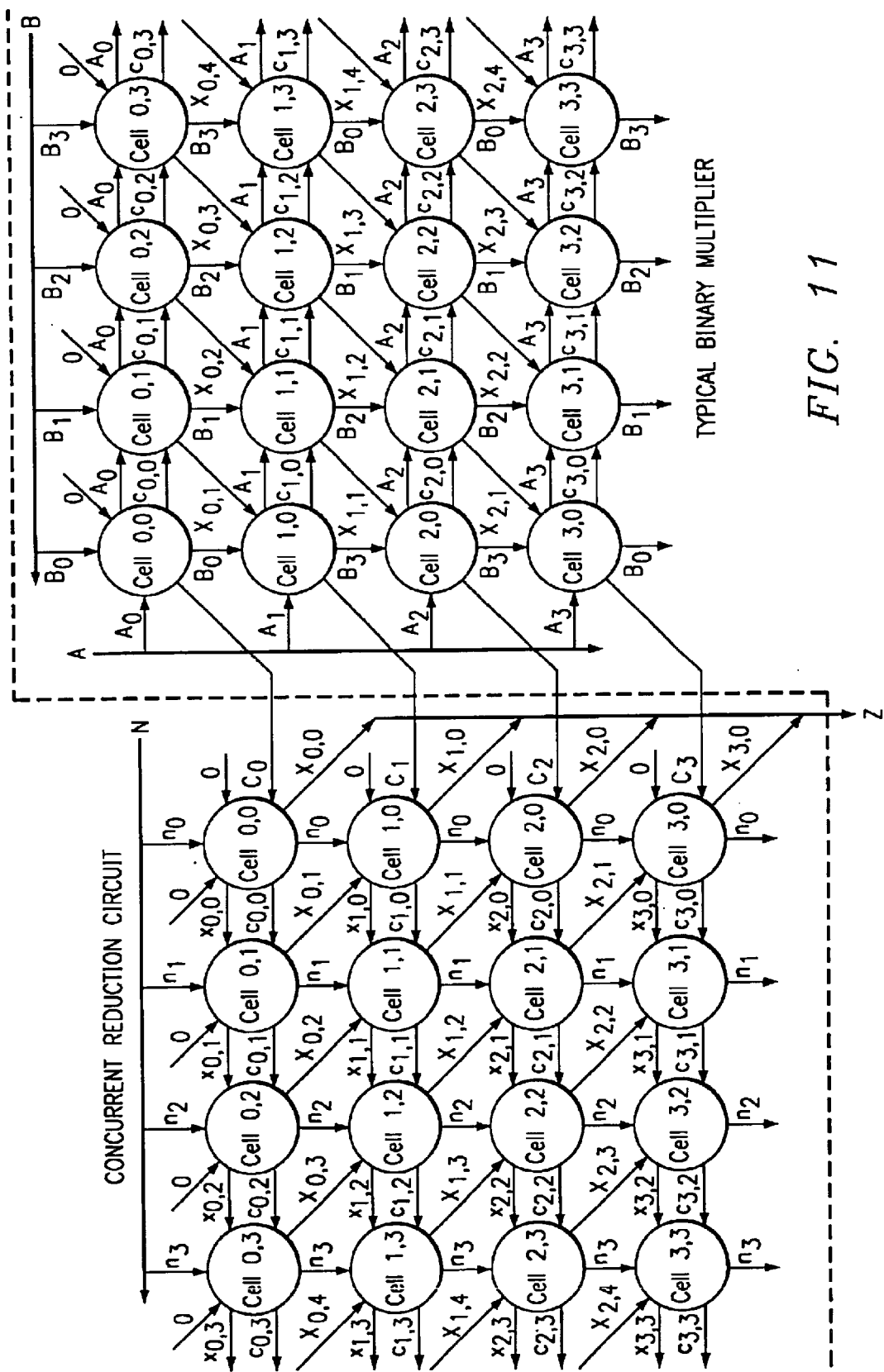
FIG. 11 is an illustration of a combined DG graph concurrent modular multiplication process.

The common practice of subdivision of R into digits allows the interleaving on the addition and multiplication steps. This can be used as the generator of a stochastic array such as described by relaxation of the constraint that R is chosen to be greater than N, and recursive application of the algorithm to derive a result very analogous to that of the digit decomposition approach. This approach to the formulation of the modular multiplication operation separates the multiplication and reduction operations into sequential, concurrent operations. The multiplication step is performed using basic binary multiplication operations and the results are fed sequentially, starting with the least significant terms into the reduction circuit. This operation continues while the higher order terms of the binary product continue to be calculated and reduced. FIG. 11 illustrates a combined DG for the concurrent modular multiplication process. As can be seen from this there is a clear partition between the multiplication and reduction stages and that also information flows from the multiplier sequentially into the reduction stage.

The input to output transfer relationships for the generic DG cell are subsequently given by:

$X_{out} = (X_{in} + x_j * n_k + c_{in}) \mod 2$, $c_{out} = (X_{in} + x_j * n_k + c_{in}) \operatorname{div} 2$, $x_j = X_{in} \mod 2$, $n_{out} = n_{in}$.

Figure 12:
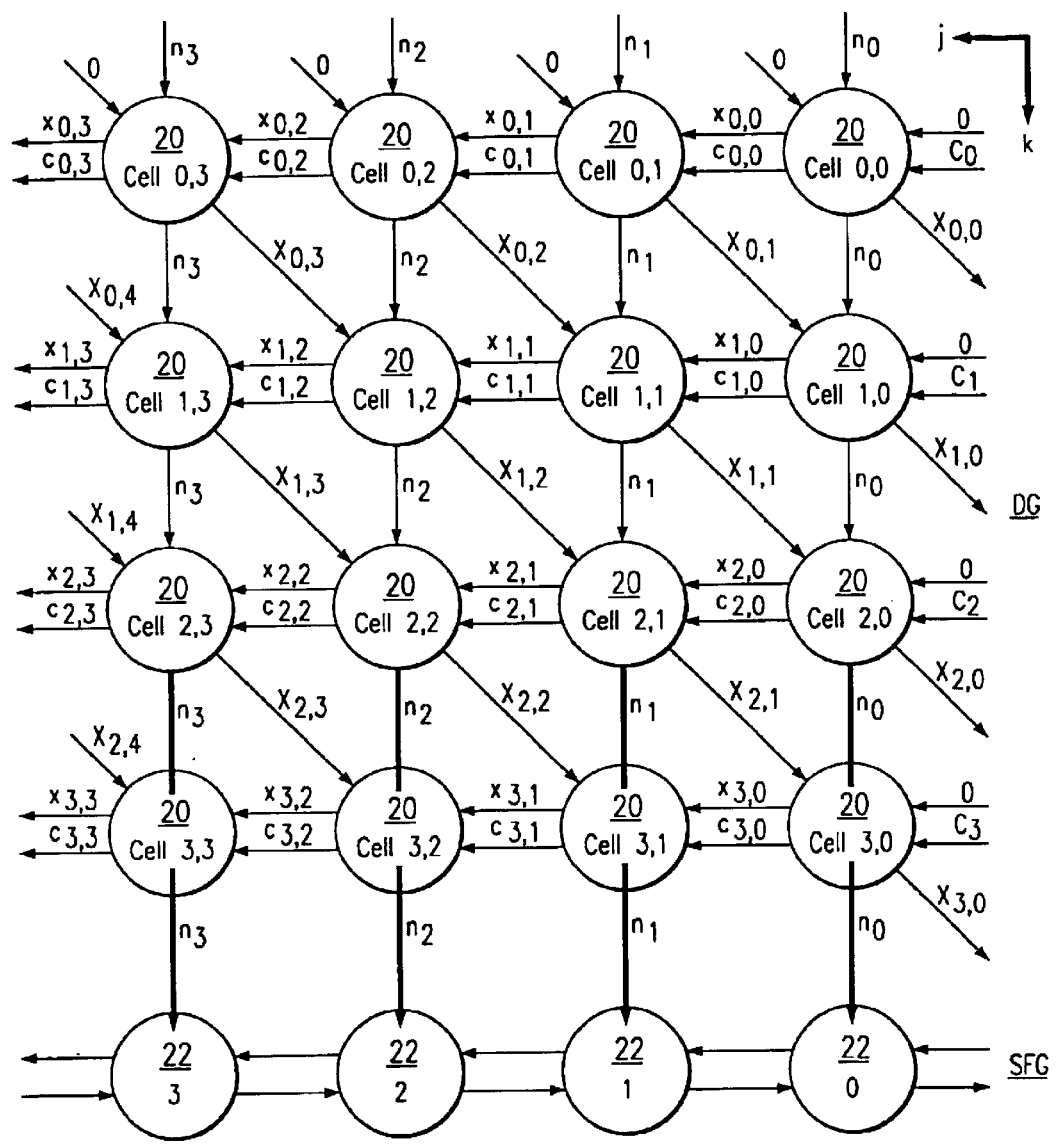
FIG. 12 illustrates a mapping of reduction DG for reduction circuits.

Focusing on the reduction stage, FIG. 12 illustrates a mapping of the reduction DG into a SFG. The DG cells are projected in the direction in which the bits of the modulus N are constant. This projection maps a single column of DG cells 20 onto a linear array of cells 22 in a SFG. Each cell represents one bit operation of the reduction algorithm. Carry terms propagate in the direction orthogonal to the direction of the mapping projection and opposite to the direction in which the results propagate. The $x_1$ terms from the algorithm are common across the cells and are propagated in the same direction as the carry terms (opposite the direction in which the results propagate). This assignment of cells dictates the most efficient scheduling of operations in time. The schedule for this projection is illustrated in the scheduling diagram shown in FIG. 13.

Figure 13:
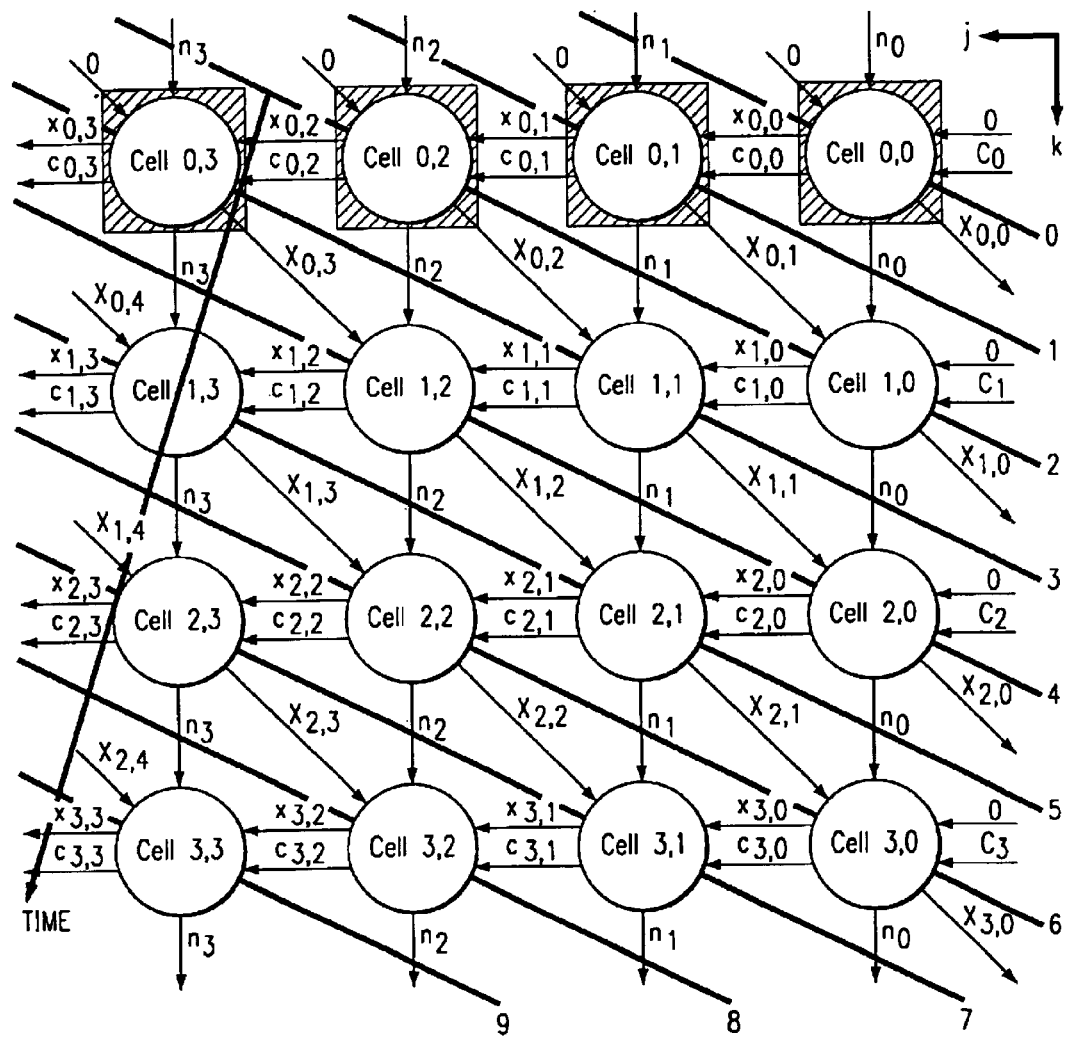
FIG. 13 illustrates mapping of DG to SFG for concurrent reduction of circuits.
Figure 14:
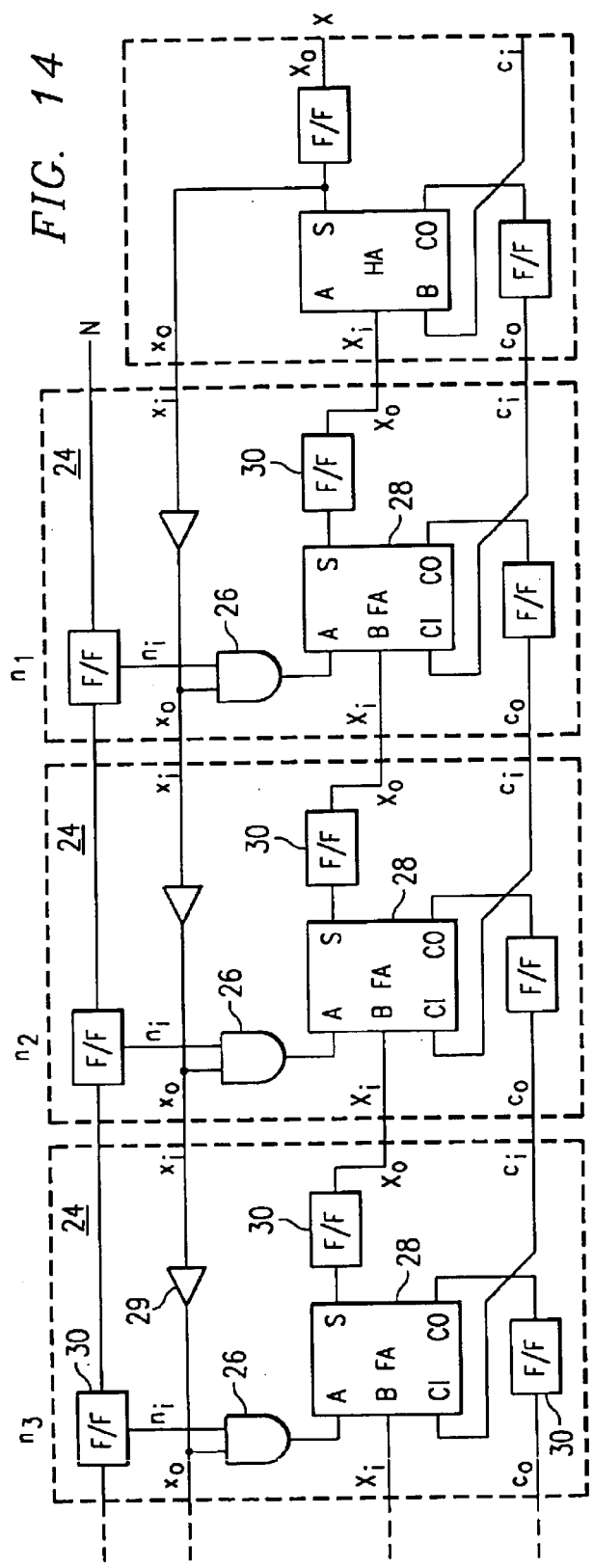
FIG. 14 is a block diagram of a cell circuit.

As can be seen from FIG. 13, the resulting schedule is very analogous to that depicted in FIG. 3 because of the inherent symmetries in the two algorithms. The cell organizations and projections are substantially identical while the actual cell operations are quite different. Combining the cell mapping from FIG. 12 and the schedule from FIG. 13, then there is derived the cell circuit implementation, which is then depicted in FIG. 14. From FIG. 14, it can be seen that each cell is of low complexity. Each cell 24 of this implementation consists of one full adder 28, registers 30, a buffer 29, and associated logic 26.

Figure 15:
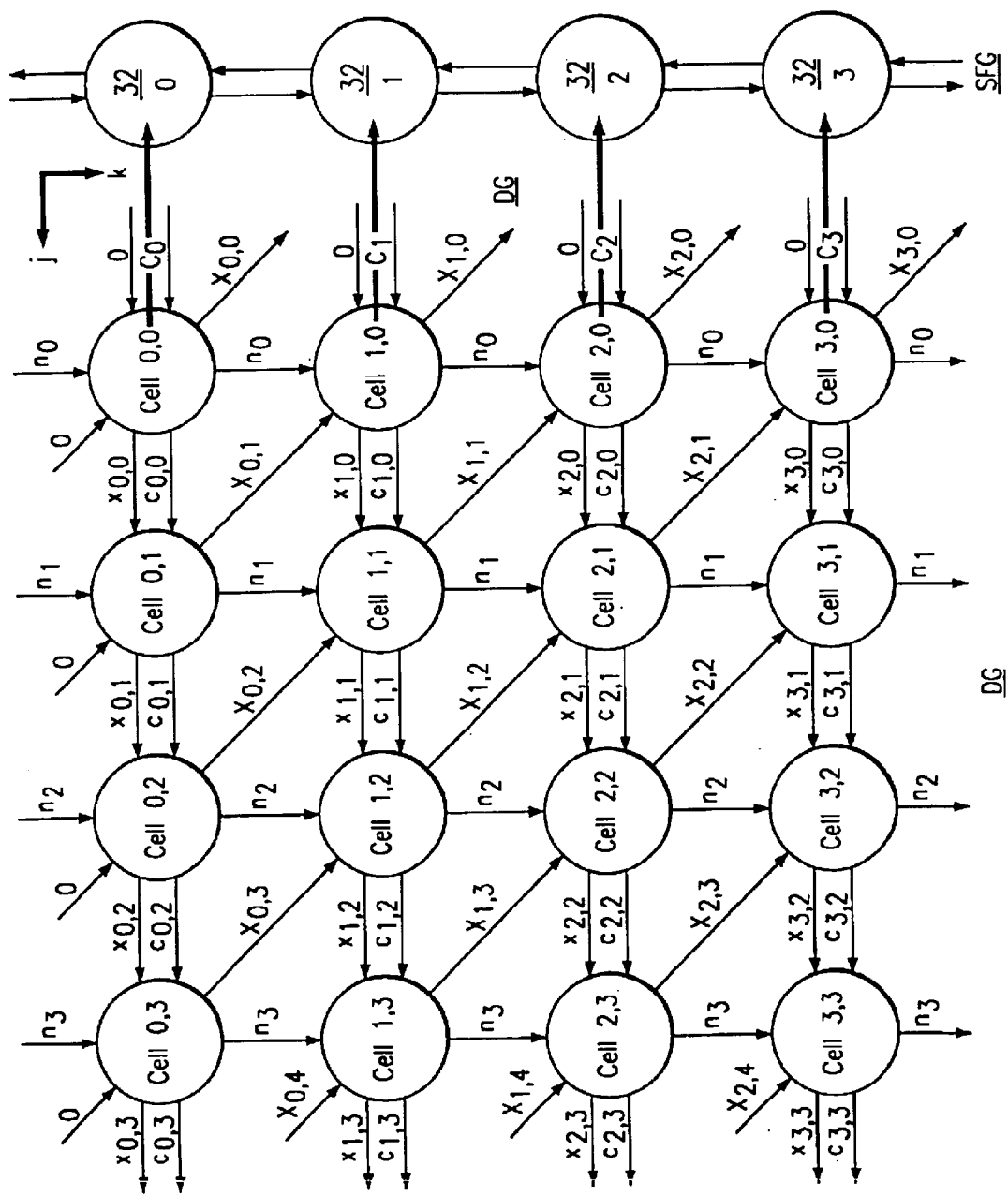
FIG. 15 illustrates a mapping of a projection onto an SFG array of processors.

To compare the results of the techniques described to the earlier results, it is informative to compare the resulting mapping into a corresponding DG map for the binary radix case. This map is depicted in FIG. 15 which also portrays a projection onto a SFG array of processors. As can be clearly seen from this diagram, the projection space is orthogonal to that of the previous implementation.

Figure 17:
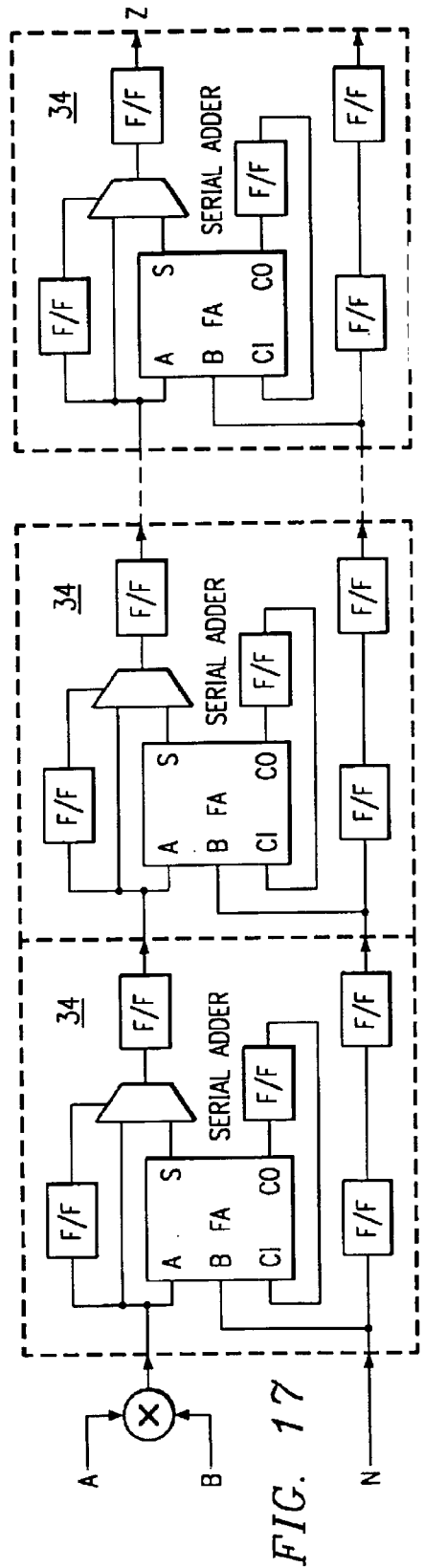
FIG. 17 is a block diagram of serial adder circuit implementation of the cell mapping outlined in FIG. 16.
Figure 16:
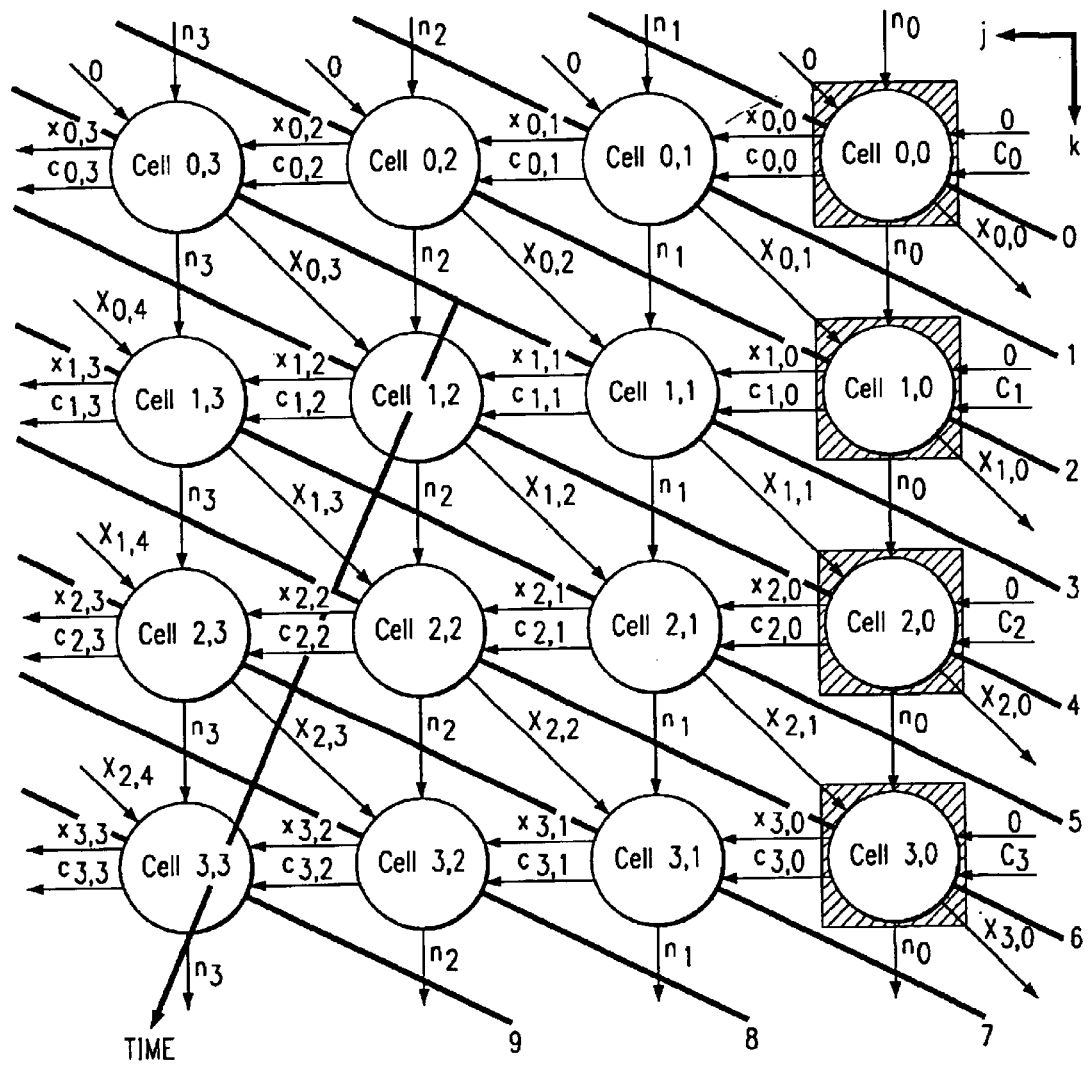
FIG. 16 illustrates a scheduling diagram for a cell matrix.

This in turn has several important implications. First, the DG to SFG projection in this implementation is orthogonal to the direction in which the bits of the modulus, N, are propagated. This means that the bits of N are shifted through the cells 32 of the SFG rather than held constant for a given cell. Second, the carry propagates are in the direction of the projection. This means that the carry terms are not propagated from cell to cell. Instead, the carry terms are accumulated within the cell. The corresponding schedule for this implementation is shown in FIG. 16. In FIG. 16, the cell mapping is outlined in dark shading. The time lines follow the direction that the result propagates. The circuit that results from this projection is portrayed in FIG. 17. From this circuit, it can be seen that one distinct difference in the circuit from the other implementations is that all cell-to-cell terms propagate only in one direction. There are no carry terms out of the cell 34. Additionally, there are also no terms which are globally distributed or are buffered through a cell 34 to any other cell 34. There are no combinatorial paths through the cell. Therefore, since there are no global or reverse connections, the connection between any two cells is equivalent and hence the array can be made to grow almost unbounded. The cell implementation is of low complexity and therefore can operate at high frequencies.

Finally, the cell connectivity has implications regarding device physical layout. There is little or no need to maintain the physical proximity of the first and last cells of the chain. The chain of cells could be arranged in a variety of geometries from a single linear array to a serpentine arrangement.

In the embodiments presented for the interleaved as well as for the concurrent multiplication case, the circuit designs were accomplished assuming all digit operations were accomplished using binary digits. It is possible to consider higher order radix operations and the significance thereof as applied to the concurrent multiplication methodologies.

The motivation for the consideration of higher order radix operations is the desire to increase overall throughput by doing more work on each pass through the digit loop of the algorithm. The larger the digit size, the fewer total digit operations that are required. With fewer digit operations, fewer clock cycles are required and thus more work is accomplished in parallel. The cost for accomplishing this increase in throughput is that the complexity of the cell required to do the bit operation is correspondingly increased. However, the total number of cells is also decreased. Doubling the digit size should cut the number of required cells in half. While it seems that the area should therefore remain constant, that is not exactly the case. The total area, to some extent should be expected actually to decrease, at least in general. This is because there are still as many operations to perform and so the occupancy of a specific arithmethric operator remains the same, whereas the amount of storage (flip/flops) between stages is reduced. Unfortunately, there are other things to consider that can have a large impact on the area and performance.

The first factor that impacts the area required to implement higher radix versions of the multiplier circuit relates to the multiplication by Nc that fell out of the calculation in the binary radix case. Unfortunately, it does not fall out in the cases where there is a higher order radix. Therefore, implementation using a higher order radix means that there some additional computational tasks to perform.

Another factor to consider is that, by increasing the work that each cell performs and thus the complexity of the cell is accordingly increased. The effect that this has on the area can produce unanticipated results. This results because the area required to implement the cell is highly dependent on the constraints imposed by the period of the required clock cycle. The advantage of the binary radix implementations is that cell size for the array can be made very simple, thus permitting high clock frequencies. This is important to enable driving the circuit at high clock frequencies, but if system constraints are such that slower clocks frequencies are desired, then this can actually be a disadvantage.

Figure 18:
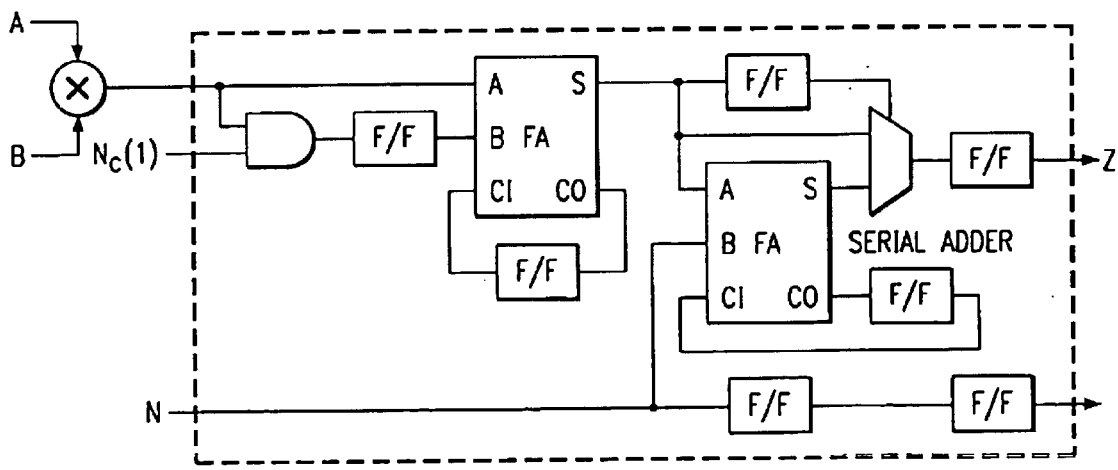
FIG. 18 is a block diagram of a radix 4 implementation of a concurrent reduction cell.

The block diagram originally portrayed in FIG. 1 shows the most general case for implementation of the reduction circuit using a higher order radix. As was done in the binary case, the comparison and subtraction step can be neglected. For the case of a radix 4 implementation, the multiplication by N results in the addition of another addition operator at the front of the cell. Depending on the value of N, N can take on either the value 1 or the value 3. An example cell implementation of the radix 4 reduction cell is illustrated in FIG. 18. FIG. 18 illustrates a minimal cost cell architecture. It is possible, however, to reduce the cell maximum path delay. This can be accomplished by insertion of additional adder cells and doing the summation operations more in parallel.

Traditionally RNS (Residue Number System) multipliers have been implemented in hardware using various ad hoc techniques such as table lookups to perform the modular multiplication of the residues. As long as the residue digits remain small and the selection of the prime basis for the RNS system remains a fixed constant, these techniques remain relatively efficient. Application of Montgomery's technique to residue number systems, however, opens up other possibilities. Circuits derived from these techniques to perform the modular multiplication can be implemented in such a manner that the circuit can be configured for a change in the modular base, or alternatively, can be a resource shared in a variety of manners.

The basis set for a residue number system draws members from the set of the first n prime numbers. It is not necessary to use consecutive primes to form a valid basis set. Let N<n. The basis set is defined by forming an N-tuple of distinct prime integers. Let the basis set be denoted by:

$$P=\{P_1, P_2, \ldots, P_N\},$$

where each of the $P_i$ denotes a unique prime number. For convenience, assume the convention of ordering the set from smallest to largest. To represent an integer, A, as a residue number, then there is formed the N-tuple:

$$A=\{a \bmod P_1, a \bmod P_2, \ldots, a \bmod P_N\}.$$

Each member of the N-tuple is commonly referred to as a digit of the residue number. The residue number can uniquely represent values in the range:

$$a \in \left\{0, 1, 2, \ldots, \prod_i^N P_i - 1\right\}.$$

Multiplication of residue numbers is accomplished by the multiplication of like digits. A unique characteristic of this operation is that the result is formed with no digit to digit carry operations required. Thus, a large multiplication can be broken down to smaller multiplies which can be performed very quickly in the absence of carry propagate conditions.

Consider application of Montgomery's Algorithm in a manner similar to that in previous descriptions. For each prime $P_i$ of the basis set, it is of interest to find a corresponding convenient number $R_i$, where $R_i > P_i$, and where $R_i$ serves as the modulus of a more convenient field for purposes of multiplication. Specifically, it is useful to consider $R_i$ of the form:

$$R_i = 2^{n_i}.$$

Each of these serve as an input to some instance of the modular multiplication block. The multiplication of each digit then proceeds as a binary number and the result converted back by an additional application of the reduction algorithm.

For many applications of residue arithmetic, it is very likely that the prime basis set may be chosen as a fixed set of prime numbers. Indeed, it is likely for the majority of applications that the number will be fixed and specifically built into the hardware. In either case, however, it is possible to achieve reductions in the complexity of the circuit and increased efficiency by choosing the parameters of the problem such that the conversion multiplications have reduced complexity from the most general case.

It is possible to realize additional efficiencies in the circuit. To see how this is possible, it is useful to consider the following expansion of an N-Residue number:

$$|x|_N = \left| \sum_{i=0}^{n-1} |2^i|_N x_j \right|_N,$$

where N is the modulus, $n = \log_2 N$ is the number of bits required to represent the number, and the $x_j$ are the binary coefficients of the expansion. In this equation, the notation $|x|a$ denotes x mod a. The sequence of powers of 2, taken mod N, are periodic.

$$|2^i|_N = |2|2^{i-1}|_N|_N = \ldots = |2^p|2^{i-p}|_N|_N.$$

However, it is clear that there must be some value for p, $p \neq i$, such that $$|2^i|_N = |2^p|_N.$$

Consequently, $$|2^i|_N = |2^{i-p}|_N,$$

which is therefore periodic with period p. Furthermore, $$|2^p|_N = 1.$$

In particular, the period, P(R) can be defined to be the distance between two 1's in the sequence. If N and R are well chosen, then the term, $R^k$ mod N, can be selected to be equal to 1. Thus, in doing so, the term, $R^{-k}$ mod N, is also equal to 1. Consequently, the above circuit can be simplified for those cases.

The generalized result is useful because, for those prime numbers where a suitable choice for $R = 2^r$ has a period that itself is an integer multiple of 2, then the period of $R^2$ mod N is half that of R mod N. This is significant because, by using higher order powers of $R^k$, not only is it possible to realize unitary multipliers, but also simplifies the complexity of the Reduct(x) circuit. Consider a finite field F and an non-zero element $\alpha$ in that field. If the sequence of powers of $\alpha$ is constructed, $$A = \{\alpha^0, \alpha^1, \alpha^2, \alpha^3, \ldots\}.$$

Each power from this sequence must also be in the field F, and further the sequence must repeat. If the period of the repeat is denoted by the number p, then the sequence can be uniquely represented by $$A = \{\alpha^0, \alpha^1, \alpha^2, \alpha^3, \ldots \alpha^{p-1}\}.$$

The integer p is referred to as the order of a, and is denoted by ord(a). It should also be clear that $$\alpha^p = 1.$$

For a given instance, it is generally difficult, given particular values for q and a to predict a value for ord($\alpha$). However, once the value of ord($\alpha$) is known, then it is easy to find ord($\alpha^i$). A sequence of interest in particular is the sequence $$R = \{2^0, 2^1, 2^2, 2^3, \ldots, 2^k \ldots 2^{p-1}\},$$

as defined over the finite field represented by $F = \alpha \bmod q$ and where q is selected from among the set of all prime numbers greater than 2. Select values for $R_k = 2^k$, and smallest powers of $R_k$ such that $$R_k^i = 1.$$

Thus for ord($R_k$) = p, then ord($R_k^i$) = p/gcd(i, p). First generate the terms ord($R_k$) for various prime numbers and then determine the value of ord($R_k^i$). This gives the smallest size binary representation for $R_k$ that has a unitary conversion coefficient.

As a simple illustration of how this technique is employed, consider the case of a Mod 113 multiplier. To implement the multiplier requires a 7 bit by 7 bit multiplication, resulting in a 14 bit output. This requires four stages of reduction to reduce the result. As discussed previously, each of the reduction stages requires an adder and a multiplexer. The circuit also requires a state controller (FSM) to time the bits through each stage. Bit zero of the result at each stage is used to gate the multiplexer in the next stage. Thus, this bit needs to be retained in a storage element (flip/flop) for the duration of the reduction. The state controller controls when this value is saved for each stage and when data is allowed to propagate through each stage. The unique feature of this embodiment is that the result does not require post multiplication since the value of $R^{-k}$ is unitary for this particular choice of parameters. By similar means then it is also possible to pick combinations of parameters resulting in simplified or minimal multiplicative terms.

Figure 19:
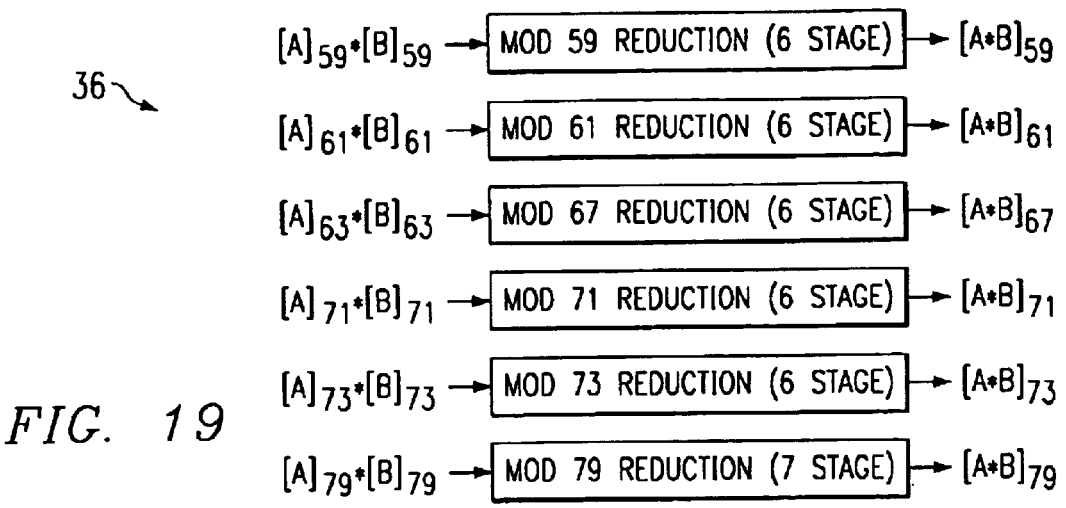
FIG. 19 is an illustration of an RNS multiplier wherein RNS numbers to be multiplied are represented by vector values.

This embodiment lends itself to designing efficient RNS multipliers such as may be applicable in some DSP applications. FIG. 19 illustrates a simple example of application to an RNS multiplier 36. The RNS numbers to be multiplied each are represented by a vector of values.

The RNS example is an example of an application where the multiplier may be best implemented using a higher order radix and fewer stages. This specific implementation generally would involve multiplication over several smaller prime fields. In most cases the basis set could be fixed. This is because the size of the multiplier likely would not be subject to change.

Table 1 illustrates the parameters required for several small prime numbers, including 113, that would be required to achieve unitary post or pre-multiplication.

TABLE 1

Multiplier Parameters for Several Selected Prime Numbers

| N | N**−1 | N_comp | r(bits) | R | R**−1 | k | Rred**k |
|---|---|---|---|---|---|---|---|
| 257 | 1 | 1 | 1 | 2 | 129 | 16 | 1 |
| 97 | 1 | 7 | 3 | 8 | 85 | 16 | 1 |
| 673 | 1 | 7 | 3 | 8 | 589 | 16 | 1 |
| 113 | 17 | 111 | 7 | 128 | 98 | 4 | 1 |
| 109 | 357 | 155 | 9 | 512 | 33 | 4 | 1 |
| 577 | 449 | 63 | 9 | 512 | 71 | 16 | 1 |

From the results illustrated in this table, it can be seen that for these, as well as other prime numbers, it is possible to choose the rise of the radix, R as well as the number of rounds, k, such that post multiplication in these cases is not required. The last row of the table represents the number that must be post multiplied to convert from an R-Residue number to integer format.

Figure 20:
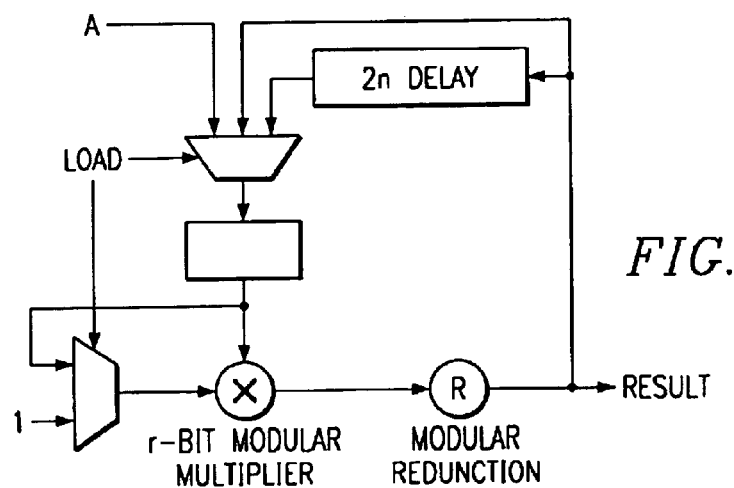
FIG. 20 is an illustration of the architecture for a recursive multiplier.

As another embodiment it is possible to construct a multiplier as a combination of a serial multiplication circuit and a reduction chain to do recursive multiplication such as might be used to perform exponentiation. The architecture of this multiplier is illustrated in FIG. 20. This circuit can be adapted to calculate powers or multiply numbers sequentially.

A primary application for modular multiplication is in the calculation of exponents in a large modular field. This has a key role in important public key cryptographic applications like RSA. As the economic importance of cryptography to society increases for the protection of the electronic infrastructure, the ability to efficiently provide the necessary performance required becomes crucial. It is the ability to implement the exponentiation of integers in large finite fields that is central to the economic viability of these technologies. It is the efficiency of implementation that will largely determine to what degree they can be used to help solve the data security issues that are being created.

Exponentiation is an inherently sequential problem. Algorithms to calculate exponents involve the sequential determination of increasing powers of the base number. The standard algorithms involve squaring and multiplication. Powers of the base are typically derived by first finding the square of the base. This is then used, by squaring, to find the base to the fourth power. This process is repeated to find the higher powers of the base. As each power is derived, a current value for the exponent is obtained by multiplication by the value of the power of the base if the corresponding coefficient is a one (binary radix).

Consequently as each round of squaring and multiplication is performed, the size of the product term grows. If the size of the multiplicands is r (bits), then the resulting product is of size 2r bits. In the field of natural numbers, the size of the final product for an exponent of size r (bits) is therefore r bits. If the desired exponentiation is required to be performed over a field of size r, it is desirable to perform a modular reduction of the product after each squaring and each multiplication operation from 2r to r bits. This requires additional operations to be performed at each round of the algorithm, but is intended to reduce the total work required, as well as the storage and physical resources required, by managing the growth in the problem size.

One well-known algorithm for the performance of exponentiation is described by:

```
function BasicExponentiate (A, E, N, r)
    Value:=1;
    Power:=A;
    for i in 0 to r−1 loop
        if E_i=1 then
            Value:=Value*Power;
            Value:=Reduction (Value, N);
        end if;
        Power:=Power*Power;
        Power:=Recution(Power, N);
    end loop;
    return Value;
end function Exponentiate;
```

This algorithm calculates the quantity $A^E$ mod N where A, E, N are all r-bit quantities. In this algorithm description, it can be clearly seen that it accommodates the direct inclusion of either the concurrent or the interleaved modular multiplication implementations previously discussed. The reduction function applied above can be implemented by the suggested Montgomery Reduct Function described previously. In this case, it is therefore optimal that a pre or post multiplication occur to transform from the integer to R-Residue space.

Assuming that there is post multiplication to reduce the result, the function BasicExponentiation, re-written, can be replaced by the function ModularExponentiation:

```
function ModularExponentiate (A, E, N, r, cons t_R_r)
    Value:=1;
    Power:=A;
    R:=2**r;
    N_c:=ModComplement(N, r);
    for i in 0 to r−1 loop
        if E_i=1 then
            Value:=Value*Power;
            Value:=Reduct(Value, R, N, N_c);
        end if;
        Power:=Power*Power;
        Power:=Reduct (Power, R, N, N_c);
    end loop;
    Value:=Value*const_R_r;
    Value:=Reduct (Value, R, N, N_c);
    return Value;
end Exponentiate.
```

The constant const_R_r is added to the standard argument list as an additional parameter. This constant can be pre-calculated based on a specific choice of modulus N and the field R in which the calculations take place. Algorithm Reduct resulted in an effective multiplication by $R^{-k}$, so therefore each multiplication requires an equivalent post multiplication by $R^{-k}$. Each step of the exponentiation represents two multiplications, one to derive the power and another to multiply the power by the current value. Hence, there are 2r multiplications required, each requiring a post multiplication by $R^k$. Therefore it is necessary to post-multiply by const_R_r=$R^{2rk}$ mod N.

Performance and resource consumption questions regarding the efficiency in which this algorithm may be performed relate to the degree of parallelism which can be imposed on mapping this algorithm to a specific hardware realization. Taken as a strictly sequential process with no attempt to take parallel operations into account and assuming that all operations are performed as bit serial operations, we get an approximate estimate of the cycles required to implement this algorithm.

This estimate represents an upper bound on the cycle time required to achieve a single exponentiation. There is no reflection in this estimate of various opportunities to perform operations in a parallel or pipelined manner. As will be hereinafter discussed, there are multiple opportunities to take advantage of parallelism to decrease the cycle time requirement and there are opportunities to take advantage of pipelining techniques to increase circuit efficiency or overall throughput.

Figure 21:
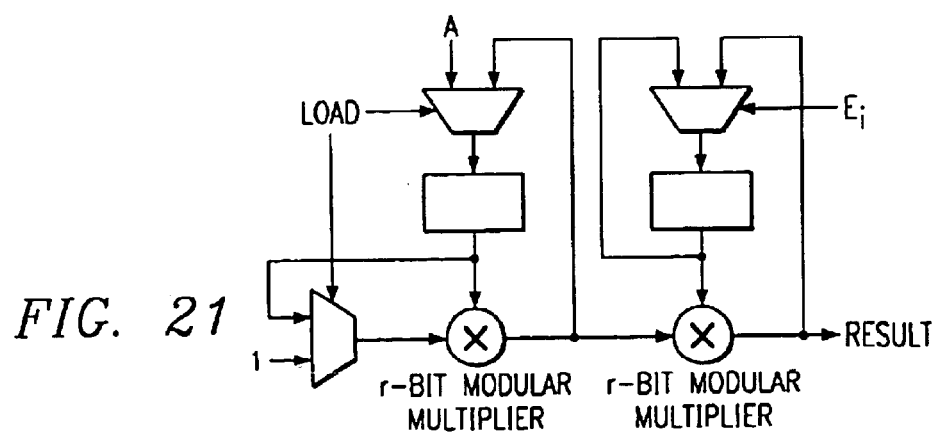
FIG. 21 illustrates circuit architecture for modular exponentiation.

An examination of the algorithm suggests that, if parallel hardware can be allocated, that the operations of squaring the powers and multiplication of the running value can be performed concurrently. It should be evident that the next power required can be obtained while the current value is obtained. Thus, if tightly coupled parallel multiplication stages are provided, then the product of the squaring operation can be fed into the input of the accumulation multiplication. It can also be fed back into the input of the squaring operation for the next round of squaring. A circuit diagram illustrating an implementation of this principle is illustrated FIG. 21.

One advantage of the present invention is that the output of a common binary multiplier is utilized and implemented as modular reduction in a very simple cell format as a serial chain of cells. Each of these simple cells consists simply of a single bit adder, a multiplexer, and associated register. Thus, the reduction cells can be made to operate at a very high clock rate. A simple example is the multiplication technique for a small modulus, but the technique is applicable to building very large multipliers. When used recursively, the size of multiplication is only limited by storage and time bounds.

Figure 22:
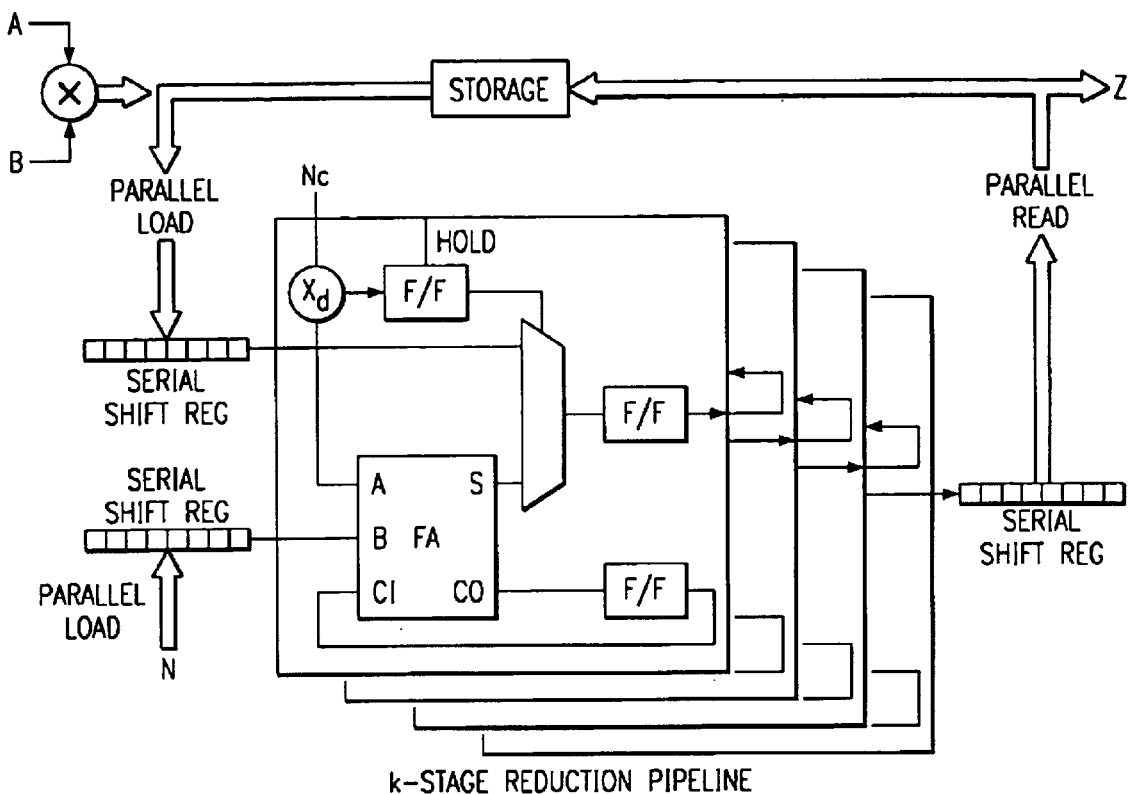
FIG. 22 illustrates a k-stage reduction pipeline for recursive multiplication of large integers.

It is also be possible to implement a large binary multiplier as a combination of a smaller parallel multiplier and product term accumulator. This architecture permits multiplication with less clock latency and perhaps more area efficiency, at a reduced clock rate. Pipelining the parallel multiplier to boost the clock rate reduces the area efficiency and thus makes serial implementation more attractive. To implement a "large" modular multiplier, for example of the order of a thousand bits, requires recursive use of the multiplier cell to calculate partial product terms which would be accumulated and fed sequentially into the reduction stage as results are available, starting with the least significant term. As is shown in FIG. 22, it is possible to use the multiplier on reduction blocks recursively to calculate the multiplication of very large integers. The multiplier block can be used to perform term-wise multiplication and terms of like powers can be summed and accumulated. This in turn can be passed to the reduction chain, which is used recursively to perform the necessary number of stages of reduction. This reduction is accomplished while the next term is being accumulated. This allows for a very efficient and straightforward circuit trade-off between hardware real estate and the time required to perform the operation.

The present invention is useful in such areas as cryptography, where multiplication and exponentiation in modular fields is of great interest. Alternative implementations provide the opportunity to consider design tradeoffs provided in the various technologies available.

Key Escrow and Key Recovery Systems are members of a larger class of cryptographic systems. Both are examples of systems targeted for deliberate exploitation in some specific manner, or whose cryptographic strength is deliberately limited.

A system is generally considered to be secure if the complexity is termed to be intractable for the anticipated length of time that the data is of value. There is no exact cutoff point, hence key sizes are chosen to be many orders of magnitude stronger than what might be minimally necessary. This is done in order to guard against better attacks or improvements in technology. Even at that, systems which were once believed to be secure for quite some time to come are frequently being broken.

A concern with techniques such as limited key size restrictions is that these requirements make it virtually impossible to guarantee, with any degree of certainty, that a given weak system cannot be broken for some specific cost and performance benchmark. One feature of the system of the present invention is that it provides a methodology for providing a deliberately weakened system accomplished in a manner that allows for more objective measurements of the strength of the system.

The present invention utilizes cryptographic techniques to provide finite, measurable barriers to information access. This is accomplished using the notion of a computational work cost function. This can be viewed, by way of analog, to the concept of economic cost functions.

The key problem to address with regards to successful realization of a finite cost system is the difficulty of proving performance bounds on algorithms and the optimality of those algorithms. Indeed this is a theoretical question that appears to be largely ignored in recent proposals and publications related to the subject of "weak cryptography."

A traditional notion in cryptography is that information can be protected by throwing up computational barriers to defeat attempts at understanding the data by an unauthorized party. This concept is referred to as computational security. The validity of the idea is based on mathematical concepts related to the general topic of computational complexity. Computational complexity relates to the study of algorithms and the difficulty or number of discrete steps in solving a problem by way of various algorithms. The complexity of computing answers to problems by the application of algorithms is generally described in terms of computational complexity classes.

One-way functions are fundamentally important to modern cryptography. Most practical cryptosystems are based on the concept of computational security. Cryptographic systems based on computational security depend on the problem of breaking the system being computationally intractable. The algorithm for breaking the system must be so difficult that the system cannot be broken using an attainable amount of computational power within a useful amount of time. A one-way function is therefore a function y=f(x), such that calculating the result of the function, y, given a specific value for x is considered "easy", whereas to find x given y is considered to be an intractable problem.

The normal definition of intractability is that the problem of finding the inverse of the function is a NP problem (and that NP is strictly harder than polynomial, P, problems). There are two problems associated with this idea. In the first place, the notions of attainable computational power and useful time are vague. The assumption of what is tractable changes with time so that which is considered secure today proves to be insecure at some point in the future. Secondly, it has not been proven that P⊂NP, and therefore it is not really known if true one-way functions even really exist.

Using this understanding of the nature of one-way functions, there is developed a notional concept of a limited one-way function. A limited one-way function can be defined as one where the condition that the function to be of NP complexity is relaxed. Limited one-way functions therefore are members of P and hence are tractable. The only requirement to meet the definition is that the function be highly asymmetric in terms of work functions to calculate and invert the function. In this context, asymmetry may be defined in terms of the ratio of work required to invert the function to the amount of work required to calculate the value of the function. Consequently, this ratio is of polynomial order and the degree of the ratio determines the degree of asymmetry and hence suitability for application.

Key escrowing systems can be characterized as being strongly asymmetric in their basic input/output bandwidth requirements. Typically, many keys are created, but few need ever be retrieved. Typically the input bandwidth of the key escrow system far exceeds the aggregate output bandwidth, perhaps by many orders of magnitude. A balanced design for such a system suggests that the algorithm for storage and retrieval match the actual bandwidth requirements. It is also advantageous to implement an algorithm that requires far less work to make a deposit than it does to make a withdrawal. Referred to herein, applicable functions that display asymmetric work requirements are defined as limited one-way functions. A feature of the invention is to use limited one-way functions to effectively limit the rate of withdrawals from a Key Escrow database. There is a distinction from normal one-way functions and hence use of the term limited because candidate functions are not necessarily strongly one-way.

Candidates for useful limited one-way functions should be provably asymmetric. Ideally, there should be provable bounds on the ratio of the amount of work required to go forward versus the work required to go backwards. This is important because the effectiveness of the function to impose costs on the user is characterized by upper and lower bounds on the ratio of work in the two directions. Another aspect of this methodology deviates significantly from a classical cryptographic application. The key escrow database server has access to the plaintext key information by possessing the master key, but is simply being penalized by a work function for key withdrawal. Therefore, the algorithm may legitimately only require that each transaction be accomplished taking a prescribed length of time, on average. This constitutes a significant shift of paradigm. The result is to limit or regulate the general flow of data out of the key escrow database. Hence, to satisfy the demands of this requirement, it may only be necessary to determine the average or statistical complexities of the limited one-way function and it's inverse.

One possible candidate would simply be to use a suitable cryptographic technique with a limited key size. This is the most straight-forward approach. It is very similar to partial key escrow techniques such as proposed by Shamir. The difference in this case being that the entire key may be escrowed but the work may be imposed prior to accomplishing key withdrawal rather than after withdrawal from the escrow. The decryption (withdrawal) is accomplished either by brute force techniques or by directly breaking the key. Since suitable cryptographic techniques to accomplish this are based on solving NP-complete problems, there are not provable tight lower bounds on the work required to accomplish this. Additionally, there may be a large differential in work required between the normal withdrawal technique (if implemented by brute force) and the backdoor path (breaking the key). Therefore, there are not necessarily very tight controls on the work required to accomplish this.

Figure 23:
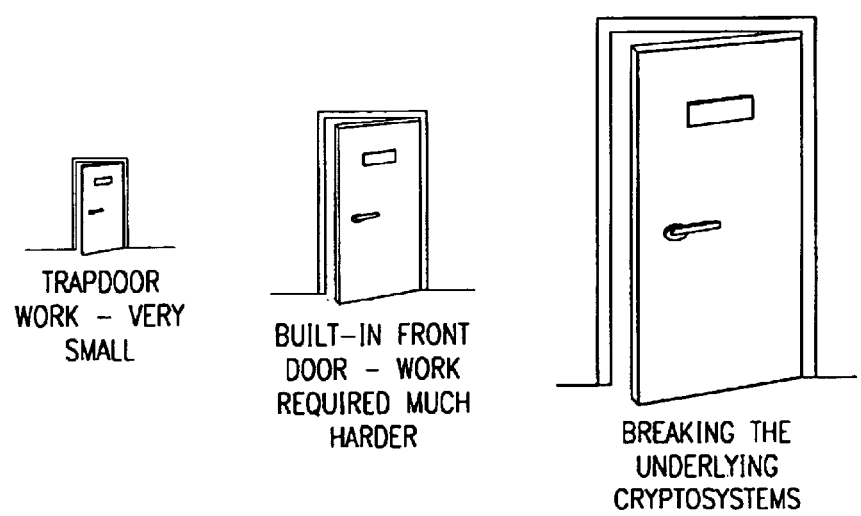
FIG. 23 is a comparison illustration of the complexity of breaking an underlying cryptosystem with built in front door capabilities.

An algorithm will be discussed that implements, as an example of a limited one-way function, one that has some desirable properties. This algorithm implements a limited one-way function by building in a front door path into a cryptosystem which is easier than breaking the underlying strong cryptosystems. This front door path, however, has performance bounds, having statistical control. The work required to go in through this front door path is considerably harder than the back door path available if one has possession of the secret information. It is, however, considerably easier than breaking the strong cryptosystems. This work difference between the three paths is illustrated in FIG. 23.

In accordance with the present invention, there is described an algorithm as an example for implementing a limited one-way function. This example algorithm is suitable for consideration for use as a work cost function for application to the problem of limiting withdrawals from a key escrow database. As was previously explained, the imposition of a cost function is one of the methods employed to limit access to a key escrow or key recovery database by otherwise authorized individuals.

A description of the algorithm will be described in terms of a message dialogue that occurs between an originator, Alice, and a message recipient, Bob. An eavesdropper, Eve, listens in on their conversation and records what passes between them, assuming perfect access to their messages. The names Alice, Bob, and Eve are traditionally used to describe participants in cryptographic transactions within the technical literature of the cryptographic community. As originator, Alice is the key requester and as the message recipient, Bob serves as the key generator. In this context, Eve will serve as the recording mechanism for the transaction that occurs between Bob and Alice. Eve does not have access to their private information or intermediate results. Eve only sees the messages that pass between them. It is further assumed that Eve has perfect knowledge of this transaction. As the recorder of this conversation, Eve is the key escrow agent in this model.

Also outlined is the achievable computational advantage that Alice and Bob can expect to achieve over Eve, the eavesdropper. This computational advantage is expressed in terms of the work required by each party to the conversation to perform the algorithm. This work differential then becomes the cost function required to discover their agreement. This then constitutes a restraint placed on the key recovery process.

Next, there is described an algorithm to the delay problem for limiting withdrawals from a key database. The application of this in the context of a national key recovery system is described, and appropriate parameters given.

The following algorithm is an example of how a suitable Limited One-Way function might be implemented. The originator, Alice constructs a set of N puzzles, which are sent to Bob. Bob selects one of the puzzles, solves it and passes information derived from the puzzle back to Alice. An eavesdropper would have to solve O(N) puzzles to discover their agreement.

In the algorithm here described, however, there shall be applied the notion of symmetric public key trap door problems to the procedure that Alice uses to construct the problems. These are trap door problems for encryption and decryption where the keys may be used interchangeably. Therefore either of the two keys may be used for encryption, and the other may be used for decryption. Alice will create a set of private public key pairs (or more generally encryption decryption function pairs). These will serve as the basis of the puzzle set.

Consider a case where the puzzle transmitted by Alice to Bob is as follows: Alice generates, using the private encryption keys, matched cryptogram/decryption key pairs $(C_0, Kp_0)$, $(C_i, K_{pi})$, $i=1, 2, \ldots, N$ corresponding to a set of messages $\{M_i\}$ where $i=1, 2, \ldots, N$ and where i is simply an index used to identify which member of the set of pairs is referenced. The message $M_i$ contains a corresponding token $T_i$. In this example, the familiar RSA system is used to illustrate the concept. Use of the RSA system is not, however, a general requirement. RSA is chosen because it has the property of key interchangeability. Consequently, Alice generates the N-element puzzle set, P:

$$P=\{(C_0, Kp_0), (C_1, KP_1), \ldots, (C_i, Kp_i), \ldots, (C_N, Kp_N)\}$$

where $C_i$ is the ith cryptogram corresponding to the ith message $M_i$, and where $Kp_i$ is the ith public key generated by Alice. $Ks_i$ is used to encrypt $M_i$ and is the secret key retained by Alice. Alice bundles each cryptogram with the decryption key, which is the public key. It is assumed that both Alice and Bob commonly agree upon the specific encryption function (which is assumed to be RSA). Once forming the puzzle set, P, Alice communicates it to Bob. Therefore we have the operation:

Alice→Bob: {P}.

Note that this notation indicates that the set {P} is transmitted from Alice to Bob.

Bob chooses one puzzle from the set at random. Therefore Bob selects the puzzle index, j, at random, where $j \in 1, \ldots N$, then chooses the jth ordered puzzle pair, $(C_j, Kp_j)$, from the set P. Bob derives the token information $T_j$ from the cryptogram $C_j$ by performing the decryption:

$$D(Kpj, Cj)=Mj; Tj \subset Mj,$$

where D is the agreed upon decryption function. Accordingly, Bob has "solved" the puzzle merely by applying the decryption key to its corresponding cryptogram to extract the original message. Thus, to perform this operation, Bob performs a small finite operation. This operation is also very simple and its complexity reasonably measurable. It would be very difficult for Bob, or anyone else to improve significantly on the performance required to derive this answer.

Bob then forms the message, $\mu j=(Tj \&\& R)$, which is the concatenation of the selected token and a randomly chosen vector R. Bob then proceeds to form the response message S, such that:

$$S=E(Kpj, \mu j),$$

where S is the agreed upon encryption function and Kpj is the public key corresponding to the puzzle that he originally chose and hence to $\mu j$. Bob then sends S to Alice. Hence Bob→Alice: S.

Alice may then recover Tj by application of the secret key Ksj. However, Alice does not know the choice Bob originally made and hence which of the N keys to use. She therefore must try keys randomly from the set of N until a match is made. Alice therefore must perform more work than Bob corresponding to the size of N. To recognize the correct result, structural information is embedded in the token Tj, so that a legitimate decode can be distinguished from a non-legitimate decode. Next, the description proceed to illustrate the computational advantage that Bob has over Alice, as well as the advantage that either has over an eavesdropper, Eve.

It is assumed that the channel between Alice and Bob cannot be tampered with, but is not secure. An eavesdropping observer, Eve, may see both the initial message P and the response S from Bob but may not modify either. Eve therefore has all of the N public keys but does not have the corresponding secret keys. To "discover" the message Eve is faced with the problem of first deriving the N tokens, then forming N*R messages of the form (Tj && R). Finally, Eve must then encrypt these and compare the result to S in order to discover Bob's choice for j.

The amount of work imposed by this algorithm upon the various parties involved must also be considered. The work that Eve is forced to perform is now greater however than that performed by either Bob or Alice. Eve does not have the benefit of having the decryption keys that are available only to Alice. Eve must try all Avg(N*R) possibilities to discover the decision that was derived where we use the notation Avg( ) to refer to the average behavior of the solution. The concept of average behavior is the approach used for analyzing the solution to the "front-door" approach.

Eve is at a disadvantage to Alice by a factor of Avg(R), the amount of randomization information embedded in the problem. This is because Eve does not posses the decryption keys, which are the sole property of Alice and are not revealed in the process. Eve is forced to try all Avg(N*R) combinations until a match is found. Eve does, however, have an alternative possible attack. Eve may attempt to break Avg(N) decryption/encryption key problems, directly attempting to discover the secret keys. This approach to solving the problem is referred to as being the traditional "back-door" approach to solving the problem. The work associated with this approach thus represents an upper limit on the amount of work that Eve must perform. Accordingly, system parameters can be selected such that Eve is forced to go in through the built in front door, because that is the only computationally viable path. Let the amount of work performed to directly break the key problem by brute force methods (the back-door approach) be represented by Avg $(W_B)$ and the amount of work that Alice performs using trapdoor information to accomplish a decryption to be represented by $Avg(W_T)$. Presume that for reasonable choices of system parameters that $Avg(W_T) << Avg(W_B)$. Then it is also reasonable to presume that $Avg(W_T) \approx W_E$ if the encryption and decryption processes are symmetric. This assumption is reasonable, for instance, of some public key cryptosystems such as RSA. The work that is now required by each party involved is given by:

$$W_{bob}=W_D=W_E.$$

$$W_{alice}=N*W_E=Avg(N*W_T),$$

$$W_{eve}=Avg(N)*W_D=MIN(Avg(N*R*E), Avg(N*W_B)).$$

The work required by Bob to efficiently perform this calculation (assuming RSA) can be estimated to be $Kn^2 \log n \log \log n$, where K is a system dependent constant. It was recently reported that the fastest single chip implementation for performing modular exponentiation is capable of evaluating 560 bit operations per 5.5 msec. Consider an example system using this chip, and using 560 bit numbers and N to be $10^3$ and R to be $10^4$.

$$W_{bob}=W_D=5.5 \text{ msec},$$

$$W_{alice}(avg)=N*W_E/2=2.75 \text{ sec},$$

$$W_{Eve}=N*R*W_E/2=2.75 \times 10^4 \text{ sec} \approx 7.6 \text{ hours}.$$

These numbers illustrate appropriate choices for a system using the device described herein. If the specific implementation was directly incorporated in the hardware that controlled the storage media, then it would be cost ineffective to try to defeat the system.

By using the described methodology, it is possible to control the amount of work that Eve must perform to solve the puzzle. In the example above, withdrawals could only occur in this system at the maximum rate of about 1146 per year. If this were to be applied to a national system for escrowing telecommunications keys, these numbers might be appropriate as well. To accomplish this, Eve is forced to perform a very large number of simple operations (on average) to resolve the answer. Because of this large number of required similar operations, it is possible, by adding enough randomization, to take advantage of average computational complexity in determining the required work. This has a distinct advantage over implementing a single weak cryptofunction such as with a limited key size. The desired performance of the proposed algorithm can be controlled by adjusting the statistical parameters. This offers a greater degree of control over the results than that offered by the simpler approach.

Figure 24:
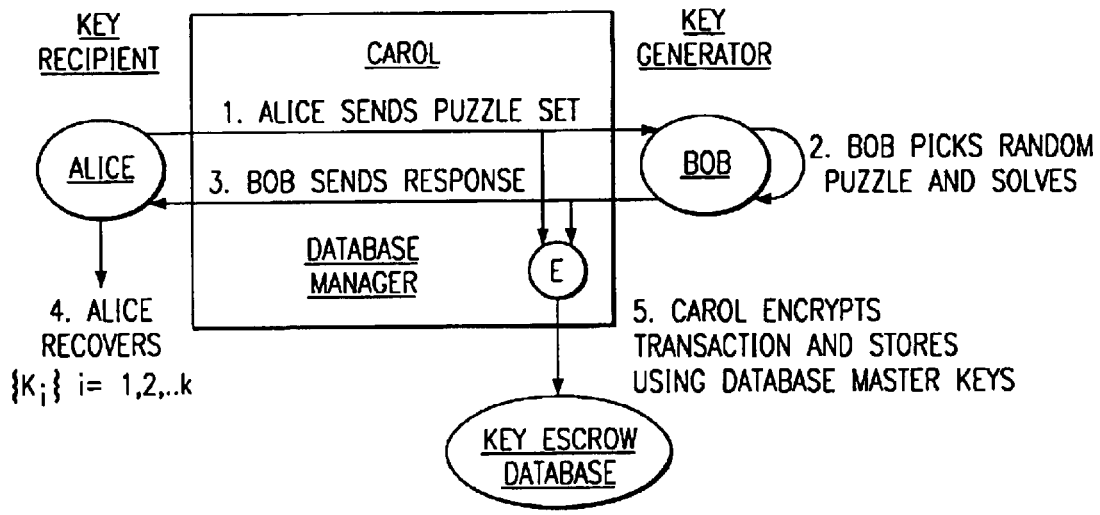
FIG. 24 is an illustration of a key escrowing process utilizing a limited one-way function algorithm.

To apply this algorithm to the problem of key escrow, consider a record made of the exchange between Alice and Bob (such as would be seen by Eve) as the material to be deposited in the escrow. Bob and Alice negotiate for a key exchange with Alice as the key requester and Bob as the key generator. Eve represents the recording/withdrawal mechanism. Prior to storage, the transaction is encrypted using a strong cryptographic technique and master keys used to protect the overall database. It is also practical to incorporate secret splitting mechanisms as well. Depending on the application Alice may either keep her secret puzzling keys, or the keys may simply be discarded as part of the process. This escrowing process is illustrated FIG. 24.

Figure 25:
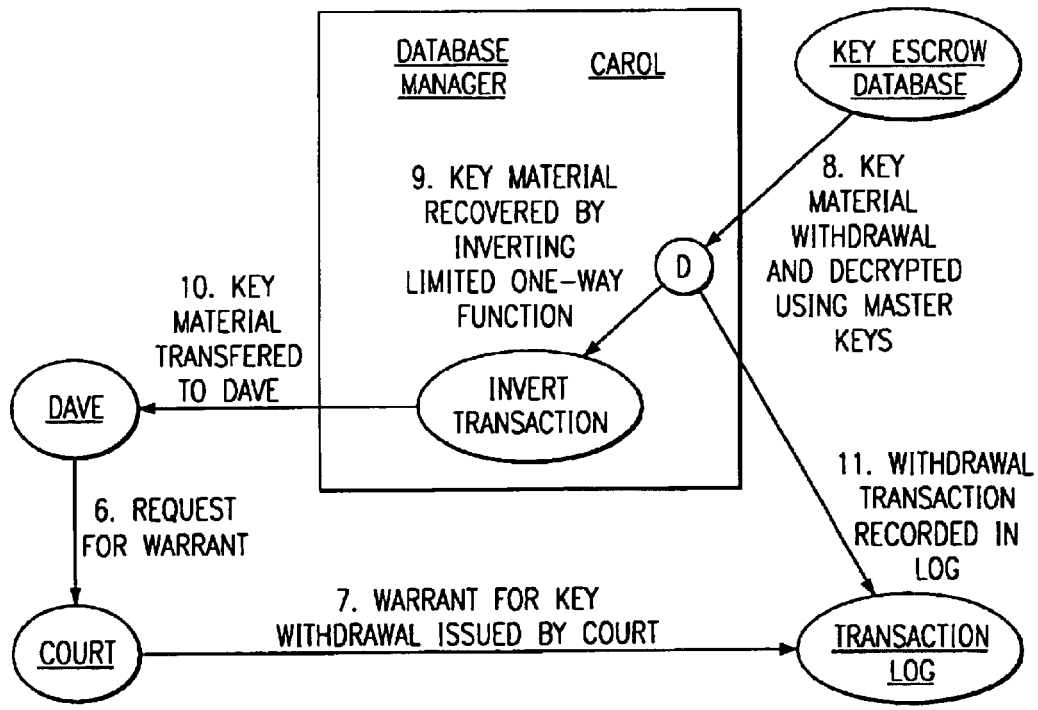
FIG. 25 is an illustration of a key withdrawal process from a key escrow database.

Withdrawal of the keying material would involve retrieval of the transactions that had occurred between Bob and Alice first using the database master key for decryption to recreate the transaction. This transaction would then have to be "broken" in the manner that Eve would need to accomplish in order to discover Bob and Alice's agreement. Thus, this second stage of decryption represents the controllable work function used to limit the rate of key withdrawal. This key withdrawal process is illustrated in FIG. 25.

The basic algorithm, previously described involved an originator, Alice, creating a set of N trapdoor functions each paired with a corresponding token. These were then to be transmitted to Bob, who in turn, would select one of these pairs at random, add randomization information to the corresponding token, encrypt using the randomly selected trapdoor function, and then return the result to Alice. Alice then uses the retained trapdoor information to discover which choice Bob made. Hence, we have Alice forming a set of encryption key/token pairs such as:

$$P=\{(T_1, E_1), (T_2, E_2), (T_3, E_3), (T_4, E_4), \ldots, (T_N, E_N)\},$$

from which Bob chooses at random the kth pair $(T_k, E_k)$. Bob takes the token, $T_k$ and concatenates randomization information R. He then uses the encryption key, $E_k$ to encrypt the combination. Therefore, Bob forms a cryptogram C such that:

$$C=E_k(T_k \&\& R),$$

where the operator && denotes the concatenation operation. $T_k$ is assumed to be an n-bit quantity, where $n=\log_2(N)$. R is assumed to take on R discrete values and is represented by an r-bit number.

The computational advantage thus achieved over an eavesdropper in this basic algorithm is dependent on the amount of randomization embedded in the problem. To discover Bob's choice the eavesdropper, Eve has the choice of breaking the N trapdoor problems that Alice originally created, or forming N*R cryptograms of the form that Bob returned. As long as the work required to break the underlying cryptosystems greatly exceeds that of creating these N*R cryptograms, the eavesdropper is forced to solve the problem by random search. This assumes that there is no structure in the results space which can be exploited. The required work is determined by solving a large number of small problems. Whereas the computational complexities of difficult problems typically do not have well defined bounds, especially lower bounds, it is possible to get tighter results on very simple operations. By forcing the calculation of a large number of simple problems, all of which whose results appear to be randomly related, the Law of Large Numbers is utilized to statistically control the work required to perform the average withdrawal.

The system of the invention is to force the eavesdropper through a work-controlled front door. This serves as the basis for providing a withdrawal capacity on a key escrow system while requiring a measurable amount of work to do so. Because the algorithm can be incorporated directly into the storage mechanism, the rate of withdrawals is therein limited by its capacity to perform the withdrawal algorithm. This approach solves the rate of withdrawal problem in an algorithmic manner.

It is possible to increase the apparent uncertainty in the problem without growing the natural size of the computational engine by use of a technique analogous to cipher chaining. As previously described in the basic algorithm, the initiator Alice forms a set consisting of N pairs of tokens and encryption keys. Also, as had been done previously, the recipient, Bob, selects one of these pairs at random and then calculates a cryptogram of the form:

$$C_1 = Ep_1(Tp_1 \&\& R_1 \&\& S),$$

where $Tp_1$, is the selected token; $Ep_1$ is the corresponding encryption key; $P_1 \in \{1, 2, \ldots, N\}$ is the index of the choice Bob made from the set P, $R_1$ is randomization information; and S is information added for signature purposes to permit valid decodings to be distinguished from invalid decodings.

To achieve his computational advantage over the eavesdropper, Bob relies on the uncertainty of his choice of puzzles, as well as randomization information that is added to the problem. Bob can increase this advantage by recursively making additional choices from the originally transmitted puzzle set. It is possible to achieve significant improvement by taking the message from this second choice and concatenating the results from the encryption of the first choice, encrypting this combination with the key from the second choice. Thus Bob chooses, again at random, a new pair $(Tp_2, Ep_2)$ from the set P. Again, Bob concatenates signature and additional randomization information. This result is subsequently encrypted using the second encryption key. Consequently, we have:

$$C_2 = Ep_2(Tp_2 \&\& R_2 \&\& S)$$

He then proceeds to take the result from his first selection, the cryptogram $C_1$, applies the newly selected encryption function, and concatenates this with the second cryptogram. This result is then encrypted using the second encryption key. Thus, we have for the output, $O_2$, of this stage:

$$O_2 = C_2 \,\&\&\, Ep_2(C_2)$$
$$= Ep_2(Tp_2 \,\&\&\, R_2 \,\&\&\, S) \,\&\&\, Ep_2$$
$$(Ep_1(Tp_2 \,\&\&\, R_2 \,\&\&\, S))$$
$$= C_2 \,\&\&\, C_{2a},$$

where $C_{2a}$ is used to denote the term $E_{p2}(E_{P2}(T_{p2} \,\&\&\, R_2 \,\&\&\, S))$.

It therefore requires two encryption operations to encrypt the information at stage two due to the increase in the block size of the input vector. The resulting number of bits of output information grows by size of the cryptogram $C_{2a}$. For two stages only, Bob's response to Alice is to transmit $O_2$. Thus, the work required to discover both of Bob's choices by random search seems to grow from being Avg(N*R) to Avg($N^2*R^2$), where Avg denotes the average computational complexity. This system is illustrated in the block diagram shown in FIG. 4.

At the receive end, Alice recovers Bob's selection by undoing the work that Bob has performed. Alice does posses unique information. Alice has the trapdoor key information allowing Alice to quickly reverse the encryption that Bob performed. Thus, Alice has the set, D, of decryption keys corresponding to the transmitted (hence public) keys.

$$D=\{D_1, D_2, D_3, D_4, \ldots, D_N\}.$$

Alice tries keys one at a time, until a match is made on the second message. This enables Alice to recover the cryptogram from the first choice.

$$D_{p2}(C_2) = D_{p2}(E_{p2}(T_{p2} \,\&\&\, R_2 \,\&\&\, S)) = T_{p2} \,\&\&\, R_2 \,\&\&\, S.$$

Alice recognizes the successful decode because of the signature information S. Consequently, there is some finite, measurable probability of a spurious decode. That occurs when a incorrect choice of the decode key accidentally maps to a pattern that matches the signature.

Alice uses the discovered choice of $D_{p2}$ to unroll the second term, $C_{2a}$. Thus, Alice gets the intermediate result:

$$D_{p2}(C_{2a}) = D_{p2}(E_{p2}(C_1)) = C_1$$

Alice again selects keys one at a time until the first choice is recovered, $$D_{P1}(C_1) + D_{p1}(E_{p1}(T_{p1} \,\&\&\, R_1 \,\&\&\, S)) = T_{p1} \,\&\&\, R_1 \,\&\&\, S.$$

Finally, the result is determined by the successful recognition of the signature S.

The work required by Alice to do this decode operation is therefore still Avg(N). This process can be extended further. If Bob makes k choices then the work required by Alice grows to Avg($k^2*N$) while the work required of the eavesdropper grows to Avg $k(N*R)^k$.

Figure 26:
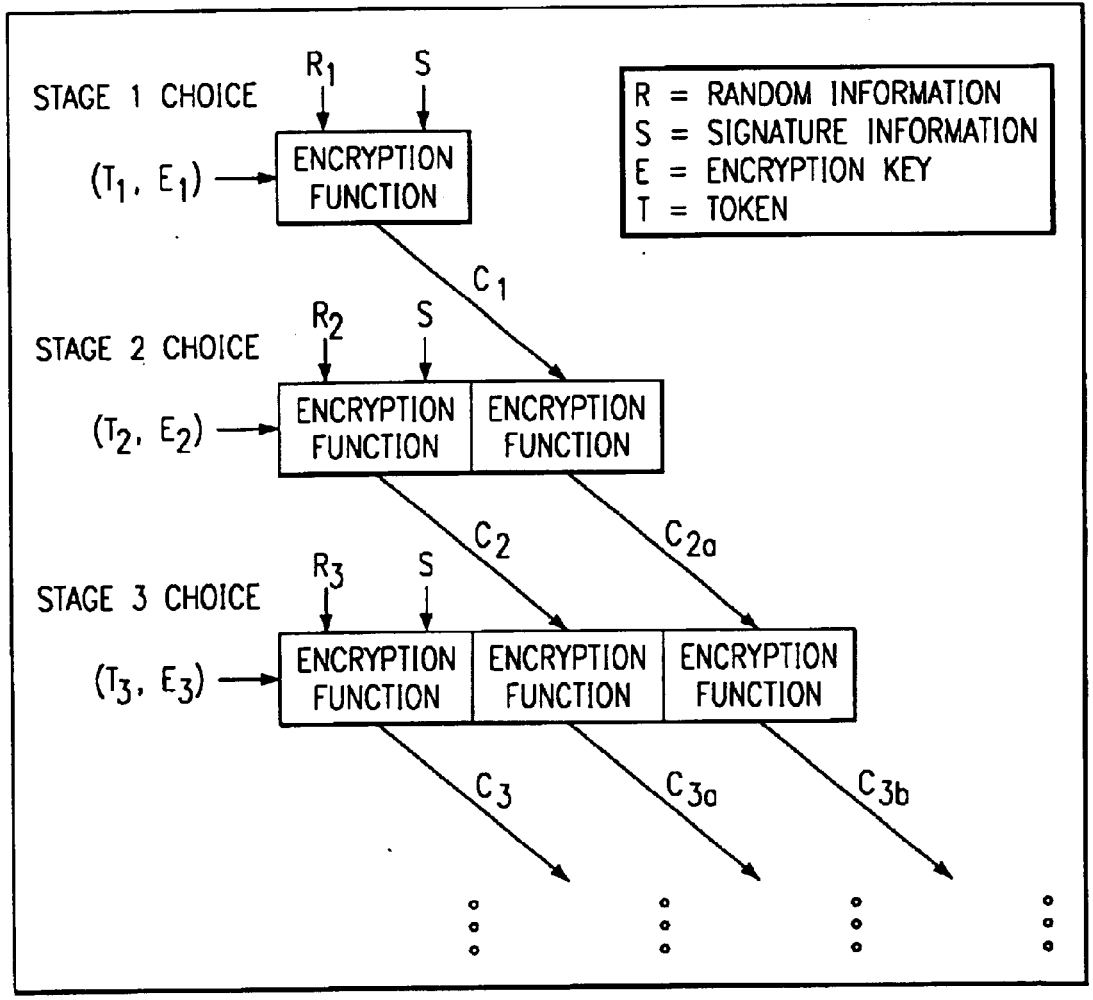
FIG. 26 is a block diagram of a multi-stage algorithm for key escrowing in accordance with the present invention.

We can express the general case of a k-stage version of the algorithm with the recursive relationship:

$$O_k = C_k \,\&\&\, E_{pk}(O_{k-1})$$

where it should be recognized that the encryption function must be applied k−1 times in order to encrypt all of the information associated with the term $O_{k-1}$. The block diagram of FIG. 26 illustrates this algorithm. As can be seen from this FIGURE, the output space of the final stage of the algorithm grows as $2^{k1}$, where 1 is the number of bits in $C_i$. It is only the final result, $O_k$, that is passed back to Alice. Therefore, neither Alice nor the eavesdropper, Eve, sees any of the intermittent results.

Once Bob transmits $O_k$ back to Alice, it becomes Alice's task to reverse Bob's selection process. As before, Alice tries keys randomly to unravel the encryption to get $T_k$. She performs the operation:

$$D_{P_k}(C_k) = D_{P_k}(E_{P_k}(T_{P_k} \,\&\&\, R_k \,\&\&\, S)) = T_{P_k} \,\&\&\, R_k \,\&\&\, S.$$

$$D_{P_k}(O_{k-1}) = D_{P_k}(E_{P_k}(O_{k-1})) - D_{P_k}(E_{P_k}((C_{k-1} \,\&\&\, E_{P_{k-1}}(O_{k-2}))$$

Alice continues this process recursively until all of Bob's choices are discovered.

To further enhance the security of the key escrow system, there is implemented a system to spread (diffuse) the information prior to input at each encryption stage. This is accomplished by mixing the token information for the current stage, the cryptogram information from the previous stage, randomization information, and the signature information together to break down structure before encryption. To do this effectively, it is necessary to use a reversible mixing function so that the structure built into the problem is spread out, yet such that the function can be easily inverted by Alice. The objective of this mixing function is to remove recoverable structure. This precludes the eavesdropper from attacking the problem piecemeal. Eve must now search the entire results space for possible matches to the kth stage message, otherwise break the underlying encryption problems.

The process Bob goes through is now modified to be:

$$C_k = E_{P_k}(M(T_{P_k} \,\&\&\, S \,\&\&\, R_k \,\&\&\, C_{k-1})),$$

and Alice's decryption process becomes:

$$M^{-1}(D_{P_k}(C_{P_k})) = M^{-1}(D_{P_k}(E_{P_k}(M(T_{P_k} \,\&\&\, S \,\&\&\, R_k \,\&\&\, C_{k-1})))) = T_{P_k} \,\&\&\, S \,\&\&\, R_k \,\&\&\, C_{k-1}.$$

Figure 27:
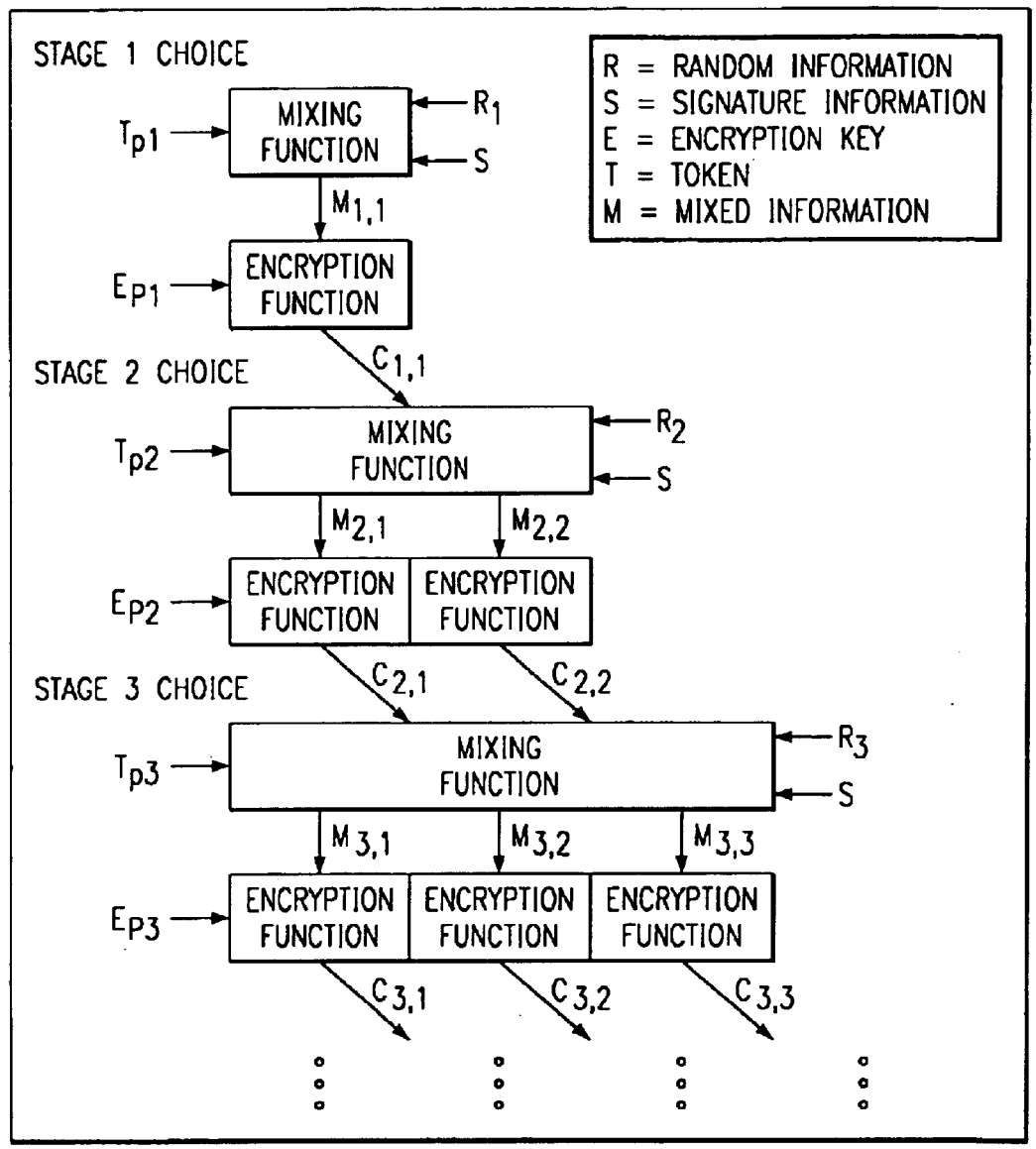
FIG. 27 is a block diagram of a multi-stage algorithm with a mixing function for encryption key escrowing in accordance with the present invention.

The added mixing function does not impose significant cost on Alice. Since Alice retains the decryption keys, Alice may do the decryption operation, invert the mixing function, and perform a match on the signature field information. Thus, the additional step of reversing the mixing function is imposed essentially with minimal cost. Consequently, the work that Alice performs at each stage of the decryption process in discovering Bob's set of choices is still Avg(kN) and the overall cost is Avg($k^2$N). A block diagram illustrating this process, which includes the mixing function, is illustrated in FIG. 27.

One measure of the computational complexity of the work required by the various participants is the number of fixed size encryption or decryption operations required. Bob obviously performs k encryption operations at each stage. Alice must perform Avg (kN) decryption operations for each stage, starting with stage k and working backwards, Eve, lacking the secret keys is forced to work in the forward direction, or else solve the N trap door problems. Thus, Eve must try, on average, all combinations of Bob's possible choices at each stage. The mixing function prevents Eve from segmenting the problem and attacking it by observing partial results. The number of decryption operations necessary to perform the work required of Alice is Avg ($k^2$N), whereas the number of encryption operations that are required by Eve to discover the choices that Bob made at each stage of the algorithm is given by $$\sum_{i=1}^{k}(NR)^i = \frac{(NR)[k(NR)^{k+1} - (k+1)(NR)^k + 1]}{(NR-1)^2}.$$

A summary of the number of operations required at each stage by Alice, Bob, and Eve is detailed in Table 2.

TABLE 2

Work Required at Each Stage

| STAGE | ALICE | BOB | EVE |
| --- | --- | --- | --- |
| 1 | N | 1 | RN |
| 2 | 2N | 2 | $2* (RN)^2$ |
| 3 | 3N | 3 | $3* (RN)^3$ |
| k | kN | k | $k* (RN)^k$ |
| Total | $Avg(k^2N)$ | $Avg(k^2)$ | $Avg(k* (RN)^k)$ |

Consider now a limited one-way function, implemented using the Discrete Log Problem implementing the delay function in a key escrow system. Initially, take the key information to be escrowed, $K_e$, and compute the following exponent:

$$V_e = \alpha^{k_e} \bmod N$$

This would be the value to be escrowed. Unless N were deliberately poorly chosen, which is one option, then this problem is intractable. Therefore, in order to reduce the problem to a tractable problem, which would be solvable in a reasonable time, it is necessary to break $K_e$, into smaller partitions and encrypt each block of data separately using a smaller key corresponding to the weakened algorithm. Thus consider the binary expansion of $K_e$, $$K_e = \sum_{i=0}^{n-1} K_{e_i} * 2^i,$$

where the $K_{e_i}$ are the binary coefficients. Utilizing a block of data of size 1<n, the number of partitions is equal to the ratio of n to 1, rounded to the next higher integer. Denote the number of blocks of data by L. Then the jth block is denoted by $$B_j = \sum_{i=j}^{(j+1)N-1} K_{e_i} * 2^i,$$

where $j \in \{0, 1, \ldots, L-1\}$. Using a reduced size discrete log modulus, chosen to be of size 1, and calculating the exponent of each block separately:

$$C_j = \alpha^{B_j} \bmod N, j \in \{0, 1, \ldots, L-1\}$$

the Cj then constitute the information that is actually escrowed. The multistage algorithm previously described requires a special mixing function. The purpose of this function is to remove structure from the information prior to each stage of encryption. This is used to limit the effectiveness of an attack based on the potential for an otherwise limited size outcome space. There are a number of possibilities for functions suitable to be used as mixing functions to meet the needs of the multistage algorithm.

Candidate functions to consider for use as suitable mixing functions include simply rearranging the bits in a predetermined manner as in a fixed "mixing box", linear transformation over the Galios Fields $GF(2^n)$, or applying a symmetric cryptosystem such as DES. One measure of the effectiveness of the selected mixing function can be ascertained by taking into account the number of bits of the output of the mixing function which change, on average, any time a particular input bit changes value. To understand the procedure for obtaining this result, first consider the output pattern resulting from each possible input pattern where a given bit is value logic zero. Then consider the output pattern that results from that same input pattern, except where the bit that was previously held to logic zero is now set to logic one. The total number of bits that change over the range of possible input patterns from this set are counted and a percentage derived. This procedure is repeated for each bit of the input vector. From the results, a relationship can be obtained for each bit relating the probability of a given input bit value given the outcome for any given output bit. For an effective mixing to occur, the probability of each input bit equal to a specific value should be selected to be as close to 0.50 as is practical.

Consider the simple example of using a linear transform as a mixing function. Selecting functions of the form aX+b (mod n), then the effectiveness of this type of function can be visualized by plotting the results for vectors of very limited size. Consider an example applying fixed size multiplier and where the parameter b is set to zero. The mixing effects are good for the lower bits but ineffective for the upper bits. Another anticipated conclusion is that there exist both good and bad choices for parameters as well.

Although a simple linear transformation does not provide a reasonable amount of mixing, ideally it would be advantageous to keep the mixing operation simple for most applications. In the previous example, a reasonable amount of mixing occurred of the least significant bits for many choices of parameters. However, little mixing occurred for the most significant bits. This suggests that the operation might be modified to achieve similar results for both ends of the vector. One possible modification would be to perform the linear transform, invert the bit order, and then to perform a second linear transform. This would roughly even out the amount of mixing that occurs from bit to bit. Consequently, there are excellent choices for parameters to achieve the desired mixing for this example. A value would be selected that results in an expected value of half of the output bits changing for any randomly selected input. Linear transformation is thus one potential choice to use as the basis for a mixing function for the multistage encryption application. It is easily invertable, and its contribution to the overall computational complexity is easily measured.

It is possible to the use of classical symmetrical cryptosystems for use as a mixing function. A symmetric cryptosystem has the useful property of being able to use the same key for both encryption as well as decryption. The use of a symmetrical cryptosystem to mix information is additionally very desirable since the function, by its very nature is designed to minimize any possible structure that remains in the information. Thus, it may safely be assume that data within an encrypted block is nearly "perfectly" spread. Since the purpose of the function is simply to spread the information in randomizing manner, while retaining the property of reversibility, it is not necessary to keep the key secret. Indeed, it is essential that both Bob and Alice know the key so that the function can be inverted. Additionally, if the key is not made public, then it may become impossible for Eve to discover the contents of the transaction between Bob and Alice, assuming that the key is large enough to be considered secure. This defeats the possibility of successful key recovery if the algorithm is applied to a key recovery system.

Public key cryptosystems may also be utilized for the mixing function. Again, as was the case with symmetric cryptographic algorithms, it is necessary to make both keys public so that the function can be reversed. Public key cryptosystems do share the property of spreading the information in a manner that makes it look statistically random, thus removing the structure of the information. These mixing functions have an advantage in that generally both the encryption and decryption operations are relatively simple. Since the function is used for mixing and not encryption, then the issue of complexity of breaking the cryptosystem does not exist. The keys are all public. Most public key cryptosystems as commonly used are based of a standard fixed block data size. However, a standard symmetric cryptosystem, such as DES, it is normally possible to tailor the block data size to meet the needs of the implementation.

Care in the selection of a candidate cryptosystem to perform the algorithm must be exercised. The mixing function and the encryption function should not have interactions that would provide a source for attack. If the two steps, that of mixing and of encryption, are commutable, then the entire purpose of mixing is completely undone. This additional requirement can be expressed as:

$$E(M(X)) \neq M(E(X))$$

where E is the encryption operation and M is the mixing operation. This should hold true for all but a small finite number of points in X.

An example of this principle can be seen by considering the mathematical operation of exponentiation. If the encryption operation is of the form:

$$E(X) = X^{K_e} \bmod N,$$

and if mixing were of the similar form:

$$M(X) = X^{K_M} \bmod N,$$

Then applying mixing followed by encryption results in:

$$E(M(X)) = E(X^{K_M} \bmod N)$$
$$= (X^{K_M} \bmod N)^{K_e} \bmod N = X^{K_e K_M}. \text{ Similarly,}$$
$$M(E(X)) = M(X^{K_e} \bmod N)$$
$$= (X^{K_e} \bmod N)^{K_M} \bmod N = X^{K_e K_M}.$$

This illustrates an example where the two operations can be commuted. Clearly the two operations should be chosen using dissimilar operations that are incompatible with regards to preserving functional structure.

It is the ability to evaluate the performance of a cryptographic system that determines, in part, the degree to which confidence can be placed in its use. This performance evaluation normally is analyzed, based on what computational work is required to "break" the system. The proposed algorithm for a key escrow system has the characteristic of being constructed in such a manner as to be deliberately breakable. A unique feature is that it provides a specifically built in solution path that is also the optimal path to the solution. Therefore, a would-be attacker is compelled to use this built-in path in order to efficiently break the problem. This "front-door" path that is built into the system requires the solution of a large number of simple problems of measurable complexity. This is in an attempt to provide an algorithmically introduced work cost function that can be controlled within tightly specified statistical bounds. Assuming that the simple problems to be solved have some distribution of required work times based on the set of input vectors and that each such solution is to be treated as independent, identically distributed (i.i.d.) random variables.

The randomization is introduced into the system by Bob adding random information at each iteration stage as well as making randomly related puzzle choices. When randomization is added to the system, the upper and lower bounds on the variance of the work function decreases. This means that it becomes increasingly difficult to do very much better (or worse) than the average time required to solve a simple problem. This is an important aspect of the application. Because of the stochastic nature of the system involved, it is possible to examine the average computational complexity of the simple problems rather than a difficult to derive tight upper or lower bounds on the complexity of those problems. Also it is possible to compare the average complexity of a large number of these simple problems to the comparatively poorly bounded complexity of one complex encryption problem. The performance of the key escrow system is thus directly related to how closely it is possible to bound the average overall complexity. Consequently, it is important to be able to predict how much randomization is required to achieve a given level of confidence.

While the invention has been described in connection with a preferred embodiment, it is not intended to limit the scope of the invention to the particular form set forth, but, on the contrary, it is intended to cover alternatives, modifications, and equivalents as may be included within the spirit and scope of the invention as defined in the appended claims.

What is claimed is:

1. Apparatus for multiplication of modular numbers, comprising:
   a two-dimensional dependency array of selectively coupled cells, where each cell comprises:
   a first full adder receiving a first input signal, a second input signal, and a clock signal; and
   a second full adder receiving an output of the first full adder, a third input signal, and a clock signal;
   the coupled cells being operable to perform an input-to-output transfer relationship wherein:
   a product output comprises a remainder of a variable modulus two, the product output representing a first number multiplied by a second number;
   the variable comprises a sum of a product input, a first product, a second product, and a quotient input, the first product representing an integer value multiplied by a modulus value, the second product related to a product of the first number and the second number;
   a quotient output comprises the variable divided by two; and
   the integer value comprises a remainder of the product input modulus two;
   a half adder receiving an output of the second full adder and a fourth input signal;
   a first storage circuit coupled to the second full adder;
   a second storage circuit coupled to the half adder; and
   a third storage circuit coupled to the half adder.

2. Apparatus for multiplication of modular numbers as in claim 1 wherein the two-dimensional dependency array comprises a row by column configuration of selectively coupled cells.

3. Apparatus for multiplication of modular numbers as in claim 1 wherein the two-dimensional dependency array comprises groups of two dependency graph cells coupled together within one pair of cells product terms of equal weight.

4. Apparatus for multiplication of modular numbers as in claim 1 further comprising a binary number reduction circuit sequentially coupled to the output of the two-dimensional dependency array of cells.

5. Apparatus for multiplication of modular numbers, comprising:
a two-dimensional dependency array of selectively coupled cells, wherein each cell comprises:
a first full adder receiving a first input signal, a second input signal, and a clock signal;
a second full adder receiving a third input signal, a fourth input signal, and a clock signal;
a third full adder receiving an output of the second full adder, a fifth input signal, and an output of the first full adder, and providing an output signal;
a fourth full adder receiving an input from the first full adder, an input from the second full adder and providing an output to the first full adder;
a first storage circuit coupled between the second full adder and the third full adder;
a second storage circuit coupled between the fourth full adder and the first full adder; and
a third storage circuit in a feedback loop coupled to the fourth full adder, the fourth adder receiving an input from the third storage circuit;
the coupled cells being operable to perform an input-to-output transfer relationship wherein:
a product output comprises a remainder of a variable modulus two, the product output representing a first number multiplied by a second number;
the variable comprises a sum of a product input, a first product, a second product, and a quotient input, the first product representing an integer value multiplied by a modulus value, the second product related to a product of the first number and the second number;
a quotient output comprises the variable divided by two; and
the integer value comprises a remainder of the product input modulus two.

6. Apparatus for multiplication of modular numbers as in claim 5 further comprising a reduction circuit coupled to the two-dimensional dependency array and sequentially receiving signals therefrom.

7. Apparatus for multiplication of modular numbers as in claim 6 wherein said reduction circuit comprises a row by column array of selectively coupled cells.

8. Apparatus for multiplication of modular numbers as in claim 6 wherein the two-dimensional dependency array of selectively coupled cells comprises a binary multiplier, and the reduction circuit comprises concurrent reduction sequentially receiving signals from the binary multiplier.

9. Apparatus for multiplication of modular numbers, comprising:
a serial array of interconnected cells each comprising:
a first full adder receiving a first input signal, a second input signal, and a clock signal;
a first storage circuit coupled in a feedback loop between an output of the first full adder and an input thereto;
a second storage circuit receiving the first input signal and providing an output signal; and
a third storage circuit coupled to the first full adder and the second storage circuit and providing an output to the adjacent cell; and
a concurrent reduction cell comprising:
a first full adder receiving a first input signal, a second input signal, and a clock signal;
a second full adder receiving an output of the first full adder, a third input signal, and a clock signal;
a first storage circuit coupled to an output of the first full adder and an input thereto;
a second storage circuit coupled to an output of the second full adder and an input thereto;
a third storage circuit coupled to an output of the first full adder and providing an output; and
a fourth storage circuit coupled to the second storage circuit and the second full adder.

10. Apparatus for multiplication of modular numbers as in claim 9 wherein adjacent cells are interconnected in a serial adder configuration.

11. Apparatus for multiplication of modular numbers as in claim 9 further comprising:
a first serial shift register having as an output a signal coupled to the first cell in the serial configuration;
a second serial shift register providing the second input to the first full adder of the first cell in the serial configuration; and
a third serial shift register serially receiving an output from the third storage circuit of the last serial adder in the serial configuration and providing a parallel output signal.

12. Apparatus for multiplication of modular numbers, comprising:
a plurality of locally related cells coupled in a two-dimensional dependency array, each of the plurality of locally related cells comprising a computing circuit; and
an input-to-output transfer relationship for the coupled cells wherein:
a product output comprises a remainder of a variable modulus two, the product output representing a first number multiplied by a second number;
the variable comprises a sum of a product input, a first product, a second product, and a quotient input, the first product representing an integer value multiplied by a modulus value, the second product related to a product of the first number and the second number;
a quotient output comprises the variable divided by two; and
the integer value comprises a remainder of the product input modulus two.

13. Apparatus for multiplication of modular numbers as in claim 12, further comprising a signal flow graph connecting to the cells coupled in the two-dimensional dependency array.

14. Apparatus for multiplication of modular numbers as in claim 12, wherein the two-dimensional dependency array comprises a row-by-column configuration of selectively coupled cells.

15. Apparatus for multiplication of modular numbers as in claim 12 wherein the two-dimensional dependency array comprises groups of two dependency graph cells coupled together to add within one pair of cells product terms of equal weight.

16. Apparatus for multiplication of modular numbers as in claim 12 wherein the two-dimensional dependency array comprises a linear array of computational cells comprising:
a first full adder receiving a first input signal, a second input signal, and a clock signal,
a second full adder receiving an output of the first full adder, a third input signal, and a clock signal;
a half adder receiving an output of the second full adder and a fourth input signal;

a first storage circuit coupled to the second full adder;

a second storage circuit coupled to the half adder; and a third storage circuit coupled to the half adder.

17. Apparatus for multiplication of modular numbers, comprising:
   a multiplication stage comprising a plurality of locally related cells coupled in a two-dimensional dependency array;
   a reduction stage comprising a plurality of locally related cells coupled in a two-dimensional dependency array, wherein the reduction stage couples to the multiplication stage; and
   an input-to-output transfer relationship for the coupled cells in the multiplication stage and the reduction stage wherein:
      a product output comprises a remainder of a variable modulus two, the product output representing a first number multiplied by a second number;
      the variable comprises a sum of a product input, a first product, and a quotient input, the first product representing an integer value multiplied by a modulus value;
      a quotient output comprises the variable divided by two; and
      the integer value comprises a remainder of the product input modulus two.

18. Apparatus for multiplication of modular numbers as in claim 17 wherein the multiplication stage two-dimensional dependency array and the reduction stage two-dimensional dependency array comprises a linear array of interconnected cells each comprising:
   a first full adder receiving a first input signal, a second input signal, and a clock signal;
   a first storage circuit coupled in a feedback loop between an output of the first full adder and an input thereto;
   a second storage circuit receiving the first input signal and providing an output signal;
   a third storage circuit coupled to the first full adder and the second storage circuit and providing an output to the adjacent cell.

19. Apparatus for multiplication of modular numbers as in claim 18 wherein the reduction stage two-dimensional dependency array comprises an array of computational cells comprising:
   a first full adder receiving a first input signal, a second input signal, and a clock signal;
   a second full adder receiving an output of the first full adder, a third input signal, and a clock signal;
   a first storage circuit coupled to an output of the first full adder and an input thereto;
   a second storage circuit coupled to an output of the second full adder and an input thereto;
   a third storage circuit coupled to an output of the first full adder and providing an output; and
   a fourth storage circuit coupled to the second storage circuit and the second full adder.

20. Apparatus for multiplication of modular numbers as in claim 17 wherein the multiplication stage two-dimensional dependency array and the reduction stage two-dimensional dependency array each comprises a row-by-column configuration of selectively coupled cells.

21. A method for multiplication of modular numbers comprising:
   coupling a plurality of locally related cells in a two-dimensional dependency array, each of the plurality of locally related cells comprising a computing circuit; and
   providing an input-to-output transfer relationship for the coupled cells wherein:
      a product output comprises a remainder of a variable modulus two, the product output representing a first number multiplied by a second number;
      the variable comprises a sum of a product input, a first product, a second product, and a quotient input, the first product representing an integer value multiplied by a modulus value, the second product related to a product of the first number and the second number;
      a quotient output comprises the variable divided by two; and
      the integer value comprises a remainder of the product input modulus two.

22. The method for multiplication of modular numbers as in claim 21 further comprising mapping the cells of the two-dimensional dependency array onto a signal flow graph comprising a linear array of cells.

23. The method for multiplication of modular numbers as in claim 21 wherein coupling the plurality of locally related cells comprises coupling the cells to a near neighbor cell.

24. A method for multiplication of modular numbers, comprising:
   coupling a first plurality of locally related cells as a multiplication stage in a two-dimensional dependency array, each of the plurality of locally related cells comprising a computing circuit;
   coupling a second plurality of locally related cells as a reduction stage in a two-dimensional dependency array; and
   providing an input-to-output transfer relationship for the coupled cells of the multiplication stage and the coupled cells of the reduction stage wherein:
      a product output comprises a remainder of a variable modulus two, the product output representing a first number multiplied by a second number;
      the variable comprises a sum of a product input, a first product, and a quotient input, the first product representing an integer value multiplied by a modulus value;
      a quotient output comprises the variable divided by two; and
      the integer value comprises a remainder of the product input modulus two.

25. A method for multiplication of modular numbers as in claim 24 wherein coupling the first plurality of locally related cells and the second plurality of locally related cells comprises coupling the cells of each plurality in a row-by-column configuration of selectively coupled cells.

26. The method for multiplication of modular numbers as in claim 25 wherein coupling the first plurality of locally related cells and the second plurality of locally related cells comprises coupling cells together to add within one pair of cells product terms of equal weight.

* * * * *